United States Patent
Fukuda et al.

(10) Patent No.: US 10,385,157 B2
(45) Date of Patent: Aug. 20, 2019

(54) BLOCKED ISOCYANATE, COATING COMPOSITION, ADHESIVE COMPOSITION, AND ARTICLE

(71) Applicant: MITSUI CHEMICALS, INC., Tokyo (JP)

(72) Inventors: Kazuyuki Fukuda, Ichihara (JP); Jun Kamada, Narashino (JP); Takashi Uchida, Chiba (JP); Masakazu Masui, Chiba (JP); Shinji Tachibana, Ichihara (JP); Hirokazu Mizuma, Ichihara (JP); Kenichi Fujii, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/913,231

(22) PCT Filed: Aug. 12, 2014

(86) PCT No.: PCT/JP2014/071289
§ 371 (c)(1),
(2) Date: Feb. 19, 2016

(87) PCT Pub. No.: WO2015/025776
PCT Pub. Date: Feb. 26, 2015

(65) Prior Publication Data
US 2016/0200858 A1 Jul. 14, 2016

(30) Foreign Application Priority Data

Aug. 23, 2013 (JP) .................................. 2013-173514
Apr. 24, 2014 (JP) .................................. 2014-089722

(51) Int. Cl.

| | | |
|---|---|---|
| *C08G 18/28* | (2006.01) | |
| *C08G 18/32* | (2006.01) | |
| *C08G 18/62* | (2006.01) | |
| *C08G 18/79* | (2006.01) | |
| *C08G 18/80* | (2006.01) | |
| *C09D 175/04* | (2006.01) | |
| *C09J 175/04* | (2006.01) | |

(52) U.S. Cl.
CPC ....... *C08G 18/8077* (2013.01); *C08G 18/285* (2013.01); *C08G 18/286* (2013.01); *C08G 18/287* (2013.01); *C08G 18/2855* (2013.01); *C08G 18/2865* (2013.01); *C08G 18/3246* (2013.01); *C08G 18/6229* (2013.01); *C08G 18/6254* (2013.01); *C08G 18/792* (2013.01); *C08G 18/807* (2013.01); *C08G 18/808* (2013.01); *C08G 18/8064* (2013.01); (Continued)

(58) Field of Classification Search
CPC ............ C08G 18/6254; C08G 18/8096; C08G 18/8077; C08G 18/286; C08G 18/287; C08G 18/285; C08G 18/2855; C08G 18/2865; C08G 18/6229; C08G 18/3246; C08G 18/792; C08G 18/8064; C08G 18/8074; C08G 18/808; C08G 18/807; C09D 175/04; C09J 175/04
See application file for complete search history.

(56) References Cited

U.S. PATENT DOCUMENTS 3,740,377 A * 6/1973 Huffman et al. ...... C08G 18/18
528/49
4,546,165 A 10/1985 Kopp
(Continued)

FOREIGN PATENT DOCUMENTS

JP 47013032 4/1972
JP 60252619 A2 12/1985
(Continued)

OTHER PUBLICATIONS

Extended European Search Report dated Mar. 2, 2017 issued in the corresponding European patent application No. 14838082.7.
(Continued)

*Primary Examiner* — Rabon A Sergent
(74) *Attorney, Agent, or Firm* — Rankin, Hill & Clark LLP

(57) ABSTRACT

The blocked isocyanate is a blocked isocyanate containing a latent isocyanate group, which is an isocyanate group blocked with a blocking agent, wherein the blocked isocyanate includes a first latent isocyanate group that is an isocyanate group blocked with a first blocking agent and a second latent isocyanate group that is an isocyanate group blocked with a second blocking agent; and the first blocking agent is represented by general formula (1) below, and has a higher catalysis activity that activates the isocyanate group than that of the second blocking agent.

[Chemical Formula 1]

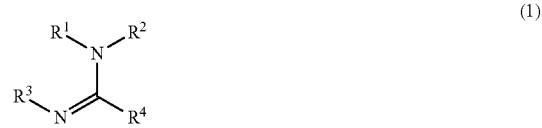

(1)

(where R1 to R3 represent a hydrocarbon group having 1 to 12 carbon atoms or a hydrogen atom, and at least one of R1 to R3 represents a hydrogen atom, and R1 and R3 may be bonded to each other to form a heterocycle. R4 represents a hydrocarbon group having 1 to 12 carbon atoms, a hydrogen atom, or an atomic group represented by —NR5R6 (R5 and R6 represent a hydrocarbon group having 1 to 12 carbon atoms, and R5 and R1 may be bonded to each other to form a heterocycle and R6 and R3 may be bonded to each other to form a heterocycle).

10 Claims, No Drawings

(52) U.S. Cl.
CPC ..... *C08G 18/8074* (2013.01); *C08G 18/8096* (2013.01); *C09D 175/04* (2013.01); *C09J 175/04* (2013.01)

(56) References Cited

U.S. PATENT DOCUMENTS

| | | | |
|---|---|---|---|
| 5,149,742 | A | 9/1992 | Hemel et al. |
| 5,322,914 | A | 6/1994 | McInnis |
| 6,965,007 | B1 | 11/2005 | Bernard |
| 2002/0064656 | A1 | 5/2002 | Klug |
| 2006/0100361 | A1 | 5/2006 | Bernard et al. |
| 2010/0184914 | A1* | 7/2010 | Jono ............... C08G 18/0823 524/591 |
| 2012/0316291 | A1 | 12/2012 | Shinomiya |

FOREIGN PATENT DOCUMENTS

| | | | |
|---|---|---|---|
| JP | 7149859 | A2 | 6/1995 |
| JP | 10251373 | A2 | 9/1998 |
| JP | 2002205458 | A2 | 7/2002 |
| JP | 2002521541 | T2 | 7/2002 |
| JP | 2004107409 | A2 | 4/2004 |
| JP | 2010059089 | A2 | 3/2010 |
| JP | 2011231306 | A2 | 11/2011 |
| JP | 2011236388 | A | 11/2011 |
| JP | 2011236388 | A2 | 11/2011 |
| JP | 2014091768 | A2 | 5/2014 |
| JP | 2014091769 | A2 | 5/2014 |
| KR | 1990-0000973 | | 2/1990 |
| WO | 85-05371 | | 12/1985 |

OTHER PUBLICATIONS

International Preliminary Report on Patentability dated Sep. 30, 2014 filed in PCT/JP2014/071289, total 13 pages.
International Search Report dated Sep. 30, 2014 filed in PCT/JP2014/071289.

* cited by examiner

BLOCKED ISOCYANATE, COATING COMPOSITION, ADHESIVE COMPOSITION, AND ARTICLE

TECHNICAL FIELD

The present invention relates to a blocked isocyanate, a coating composition, an adhesive composition, and an article; in particular, the present invention relates to a blocked isocyanate used as a curing agent, a coating composition and an adhesive composition containing the blocked isocyanate, and furthermore, to articles in which the coating composition and the adhesive composition are used.

BACKGROUND ART

In blocked isocyanates, the blocking agent is dissociated by heat and the isocyanate group is regenerated, and blocked isocyanates have a long pot life and excellent processability, and therefore often used as a curing agent for polyurethane resin, such as coatings and adhesives, produced by curing a polyol component (main component) and an isocyanate component (curing agent).

Patent Document 1 (ref: Examples 1 to 5) proposed such blocked isocyanates, for example, a blocked isocyanate produced by allowing an isocyanate group of hexamethylene diisocyanate trimer to react with 30 to 70 mol % of methyl ethyl ketoneoxime (MEKO) and 30 to 70 mol % of 3,5-dimethylpyrazole (DMP) as blocking agents.

CITATION LIST

Patent Document

Patent Document 1: Japanese Unexamined Patent Publication No. 2011-236388

SUMMARY OF THE INVENTION

Problem to be Solved by the Invention

Meanwhile, when the blocked isocyanate is used as a curing agent, generally, the blocking agent has to be dissociated (deblocking) by heating to be cured. In recent years, in view of decreasing energy and costs, it is demanded that the blocking agent is dissociated under a relatively low temperature, that is, low temperature curing properties.

However, the blocked isocyanate produced by using the above-described blocking agent is disadvantageous in that the low temperature curing properties are insufficient.

An object of the present invention is to provide a blocked isocyanate with excellent low temperature curing properties, a coating composition and an adhesive composition containing the blocked isocyanate, and furthermore, articles in which the coating composition and the adhesive composition are used.

Means for Solving the Problem

A blocked isocyanate of the present invention contains a latent isocyanate group, which is an isocyanate group blocked with a blocking agent, wherein the blocked isocyanate contains a first latent isocyanate group that is an isocyanate group blocked with a first blocking agent and a second latent isocyanate group that is an isocyanate group blocked with a second blocking agent; the first blocking agent is represented by general formula (1) below, and has a higher catalysis activity that activates the isocyanate group than that of the second blocking agent:

[Chemical Formula 1]

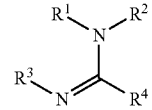

(1)

(where R1 to R3 represent a hydrocarbon group having 1 to 12 carbon atoms or a hydrogen atom and at least one of R1 to R3 represents a hydrogen atom, and R1 and R3 may be bonded to each other to form a heterocycle. R4 represents a hydrocarbon group having 1 to 12 carbon atoms, a hydrogen atom, or an atomic group represented by $-NR^5R^6$ (R5 and R6 represent a hydrocarbon group having 1 to 12 carbon atoms, and R5 and R1 may be bonded to each other to form a heterocycle, and R6 and R3 may be bonded to each other to form a heterocycle)).

It is preferable that in the blocked isocyanate of the present invention, the first latent isocyanate group content relative to a total amount in mol of the first latent isocyanate group and the second latent isocyanate group is 1 mol % or more and 80 mol % or less.

In the blocked isocyanate of the present invention, it is preferable that in the first blocking agent represented by general formula (1), R4 represents an atomic group represented by $-NR^5R^6$ (R5 and R6 represent a hydrocarbon group having 1 to 12 carbon atoms, and R5 and R1 may be bonded to each other to form a heterocycle and R6 and R3 may be bonded to each other to form a heterocycle).

In the blocked isocyanate of the present invention, it is preferable that in the first blocking agent represented by general formula (1), R1 to R3 represent an alkyl group having 1 to 12 carbon atoms or a hydrogen atom, and at least one of R1 to R3 represents a hydrogen atom, and R4 represents $-NR^5R^6$ (R5 and R6 represent an alkyl group having 1 to 12 carbon atoms).

In the blocked isocyanate of the present invention, the second blocking agent has a dissociation temperature of 130° C. or less.

In the blocked isocyanate of the present invention, it is preferable that the first latent isocyanate group and the second latent isocyanate group are both present in one molecule.

It is preferable that the blocked isocyanate of the present invention is modified with a hydrophilic compound containing an active hydrogen group.

A coating composition of the present invention contains the above-described blocked isocyanate.

An adhesive composition of the present invention contains the above-described blocked isocyanate.

An article of the present invention is coated with the above-described coating composition.

An article of the present invention is adhered using the above-described adhesive composition.

Effect of the Invention

The blocked isocyanate of the present invention has excellent low temperature curing properties. The coating composition and the adhesive composition, and furthermore the article in which these compositions are used of the present invention can achieve low energy and low costs.

DESCRIPTION OF EMBODIMENTS

The blocked isocyanate of the present invention is a blocked isocyanate containing a latent isocyanate group that is an isocyanate group blocked with a blocking agent (first blocking agent and second blocking agent), and for example, can be produced by allowing a polyisocyanate compound to react with a first blocking agent and a second blocking agent.

Examples of the polyisocyanate compound include polyisocyanate monomers and polyisocyanate derivatives.

Examples of the polyisocyanate monomer include polyisocyanates such as aromatic polyisocyanate, aralkyl polyisocyanate, aliphatic polyisocyanate, and alicyclic polyisocyanate.

Examples of the aromatic polyisocyanate include aromatic diisocyanates such as tolylene diisocyanates (2,4- or 2,6-tolylene diisocyanate or a mixture thereof) (TDI), phenylene diisocyanates (m-, p-phenylenediisocyanate or a mixture thereof), 4,4'-diphenyl diisocyanate, 1,5-naphthalene diisocyanate (NDI), diphenylmethane diisocyanate (4,4'-, 2,4'- or 2,2'-diphenylmethane diisocyanate or a mixture thereof) (MDI), 4,4'-toluidinedi isocyanate (TODI), and 4,4'-diphenylether diisocyanate.

Examples of the aralkyl polyisocyanate include aralkyldiisocyanates such as xylylenediisocyanate (1,3- or 1,4-xylylenediisocyanate or a mixture thereof) (XDI), tetramethylxylylene diisocyanate (1,3- or 1,4-tetramethylxylylene diisocyanate or a mixture thereof) (TMXDI), and ω,ω'-diisocyanate-1,4-diethylbenzene.

Examples of the aliphatic polyisocyanate include aliphatic diisocyanates such as trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), 1,5-pentamethylenediisocyanate (PDI), 1,6-hexamethylene diisocyanate (HDI), 2,4,4- or 2,2,4-trimethylhexamethylene diisocyanate, 2,6-diisocyanate methylcaproate.

Examples of the alicyclic polyisocyanate include alicyclic diisocyanates such as 1,3-cyclopentanediisocyanate, 1,3-cyclopentene diisocyanate, cyclohexanediisocyanate (1,4-cyclohexanediisocyanate, 1,3-cyclohexanediisocyanate), 3-isocyanatomethyl-3,5,5-trimethylcyclohexylisocyanate (isophoron diisocyanate) (IPDI), methylenebis(cyclohexylisocyanate)(4,4'-, 2,4'- or 2,2'-methylenebis(cyclohexylisocyanate, and Trans,Trans-isomer, Trans,Cis-isomer, Cis,Cis-isomer, or a mixture thereof)) ($H_{12}$MDI), methylcyclohexanediisocyanate (methyl-2,4-cyclohexanediisocyanate, methyl-2,6-cyclohexanediisocyanate), norbornanediisocyanate (isomers or a mixture thereof) (NBDI), and bis(isocyanatomethyl) cyclohexane (1,3- or 1,4-bis(isocyanatomethyl) cyclohexane or a mixture thereof) ($H_6$XDI).

These polyisocyanate monomers may be used singly or in combination of two or more.

Examples of the polyisocyanate derivative include multimers (e.g., dimers, trimers (e.g., isocyanurate-modified products, iminooxadiazinedione-modified products) pentamers, septamers, etc.) of the above-described polyisocyanate monomer, allophanate-modified products (e.g., allophanate-modified product produced by reaction of the above-described polyisocyanate monomer with a low molecular-weight polyol to be described later, etc.), polyol-modified products (e.g., polyol-modified product (alcohol adduct) produced by reaction of a polyisocyanate monomer with a low molecular-weight polyol to be described later, etc.), biuret-modified products (e.g., biuret-modified product produced by reaction of the above-described polyisocyanate monomer with water or amines, etc.), urea-modified products (e.g., urea-modified product produced by reaction of the above-described polyisocyanate monomer with diamine, etc.), oxadiazinetrione-modified products (e.g., oxadiazinetrione produced by reaction of the above-described polyisocyanate monomer with carbon dioxide, etc.), carbodiimide-modified products (a carbodiimide-modified product produced by decarboxylation condensation reaction of the above-described polyisocyanate monomer, etc.), urethodione-modified products, and uretonimine-modified products.

Furthermore, examples of the polyisocyanate derivative also include polymethylenepolyphenylpolyisocyanate (crude MDI and polymeric MDI).

These polyisocyanate derivatives may be used singly or in combination of two or more.

These polyisocyanate compounds may be used singly or in combination of two or more.

When two or more polyisocyanate compounds are to be used in combination, for example, at the production of the blocked isocyanate, the two or more polyisocyanate compounds can be allowed to react at the same time, or blocked isocyanates produced individually by using the polyisocyanate compounds can be mixed.

For the polyisocyanate compound, preferably, aliphatic polyisocyanate and a derivative thereof, and alicyclic polyisocyanate and a derivative thereof are used.

Use of the above-described polyisocyanate compound allows for production of a blocked isocyanate having excellent low temperature curing properties, and as described later, having a relatively longer pot life even if it is dispersed in water, and furthermore, can be used as a curing agent component for a one-component polyurethane resin.

The first blocking agent causes inactivation by blocking the isocyanate group, while after de-blocking, activates the isocyanate group. Furthermore, the first blocking agent has catalysis activity (described later) to activate the isocyanate group under a state in which the isocyanate group is blocked or de-blocked.

To be specific, the first blocking agent has a higher catalysis activity (described later) that activates the isocyanate group than that of the second blocking agent described later, and is represented by the general formula (1) below.

[Chemical Formula 1]

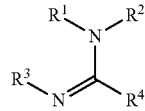

(1)

(where R1 to R3 represent a hydrocarbon group having 1 to 12 carbon atoms or a hydrogen atom, and at least one of R1 to R3 represents a hydrogen atom, and R1 and R3 may be bonded to each other to form a heterocycle. R4 represents a hydrocarbon group having 1 to 12 carbon atoms, a hydrogen atom, or an atomic group represented by —$NR^5R^6$ (R5 and R6 represent a hydrocarbon group having 1 to 12 carbon atoms, and R5 and R1 may be bonded to each other to form a heterocycle and R6 and R3 may be bonded to each other to form a heterocycle).)

In the above-described general formula (1), R1 to R3 may be the same or different from each other, represents a hydrocarbon group having 1 to 12 carbon atoms or a hydrogen atom, and at least one of R1 to R3 represents a hydrogen atom.

Examples of the hydrocarbon group having 1 to 12 carbon atoms represented by R1 to R3 include an alkyl group having 1 to 12 carbon atoms and an aryl group having 6 to 12 carbon atoms.

Examples of the alkyl group having 1 to 12 carbon atoms include an open-chain alkyl group having 1 to 12 carbon atoms and a cyclic alkyl group having 3 to 12 carbon atoms.

Examples of the open-chain alkyl group having 1 to 12 carbon atoms include a straight chain or branched open-chain alkyl group having 1 to 12 carbon atoms such as methyl, ethyl, propyl, isopropyl, butyl, isobutyl, sec-butyl, tert-butyl, pentyl, isopentyl, tert-pentyl, hexyl, heptyl, octyl, nonyl, isononyl, decyl, undecyl, and dodecyl.

Examples of the cyclic alkyl group having 3 to 12 carbon atoms include cyclopropyl, cyclobutyl, cyclopentyl, cyclohexyl, cycloheptyl, cyclooctyl, cyclononyl, cyclodecyl, and cyclododecyl.

Examples of the aryl group having 6 to 12 carbon atoms include phenyl, tolyl, xylyl, naphthyl, azulenyl, and biphenyl.

These hydrocarbon groups having 1 to 12 carbon atoms in R1 to R3 may be the same or different from each other.

For the hydrocarbon group having 1 to 12 carbon atoms, in view of improving low temperature curing properties, preferably, an alkyl group having 1 to 12 carbon atoms is used, more preferably, an open-chain alkyl group having 1 to 12 carbon atoms is used.

R1 and R3 can be bonded to each other to form a heterocycle.

The heterocycle formed by R1 and R3 bonded to each other is a nitrogen-containing heterocycle having —N=C—N— structure, and examples thereof include, without particular limitation, a 3 to 20-membered ring heterocycle, preferably 3 to 10-membered ring, more preferably 3 to 8-membered ring, further more preferably 5 to 7-membered ring heterocycle. The heterocycle may be, for example, monocyclic or for example, a polycyclic in which a plurality of monocyclics sharing a side. The heterocycle may be a conjugated heterocycle. When R1 and R3 are bonded to each other to form a heterocycle, R2 represents a hydrogen atom.

Examples of the heterocycle structure include, to be specific, for example, an imidazole structure, imidazoline structure, and pyrimidine structure.

In the above-described general formula (1), R4 represents a hydrocarbon group having 1 to 12 carbon atoms, a hydrogen atom, or an atomic group represented by —NR$^5$R$^6$ (R5 and R6 represent a hydrocarbon group having 1 to 12 carbon atoms, and R5 and R1 may be bonded to each other to form a heterocycle and R6 and R3 may be bonded to each other to form a heterocycle), preferably, a hydrocarbon group having 1 to 12 carbon atoms, or an atomic group represented by —NR$^5$R$^6$ (R5 and R6 represent a hydrocarbon group having 1 to 12 carbon atoms, and R5 and R1 may be bonded to each other to form a heterocycle and R6 and R3 may be bonded to each other to form a heterocycle).

Examples of the hydrocarbon group having 1 to 12 carbon atoms represented by R4 include the above-described hydrocarbon group having 1 to 12 carbon atoms, and in view of improving low temperature curing properties, preferably, an alkyl group having 1 to 12 carbon atoms is used, more preferably, an open-chain alkyl group having 1 to 12 carbon atoms is used.

In the atomic group represented by —NR$^5$R$^6$, R5 and R6 may be the same or different from each other, and represent a hydrocarbon group having 1 to 12 carbon atoms.

Examples of the hydrocarbon group having 1 to 12 carbon atoms represented by R5 and R6 include the above-described hydrocarbon group having 1 to 12 carbon atoms, and in view of improving low temperature curing properties, preferably, an alkyl group having 1 to 12 carbon atoms is used, and more preferably, an open-chain alkyl group having 1 to 12 carbon atoms is used.

When R4 is an atomic group represented by —NR$^5$R$^6$, R5 and R1 may be bonded to each other to form a heterocycle and R6 and R3 may be bonded to each other to form a heterocycle. The heterocycle formed from R1, R3, R5, and R6 may be polycyclic in which a plurality of monocyclics share a side. The heterocycle formed in such a case is a nitrogen-containing heterocycle having —N=C—N— structure, and without particular limitation, for example, 6 to 20-membered ring heterocycle, preferably 6 to 15-membered ring, more preferably 6 to 12-membered ring, more preferably 10 to 12-membered ring heterocycle. The heterocycle can be a conjugated heterocycle. When R1, R3, R5, and R6 form a heterocycle, R2 represents a hydrogen atom.

Examples of the heterocycle structure include, to be specific, for example, a triazabicyclo cyclic structure.

For R4, in view of improving low temperature curing properties, preferably, an atomic group represented by —NR$^5$R$^6$ (R5 and R6 represent a hydrocarbon group having 1 to 12 carbon atoms, and R5 and R1 may be bonded to each other to form a heterocycle and R6 and R3 may be bonded to each other to form a heterocycle.) is used.

For the first blocking agent, to be specific, an imidazole compound, an imidazoline compound, a pyrimidine compound, and a guanidine compound are used.

Examples of the imidazole compound include imidazole (dissociation temperature 100° C.), benzimidazole (dissociation temperature 120° C.), 2-methyl imidazole (dissociation temperature 70° C.), 4-methyl imidazole (dissociation temperature 100° C.), 2-ethylimidazole (dissociation temperature 70° C.), 2-isopropyl imidazole, 2,4-dimethyl imidazole, and 2-ethyl-4-methyl imidazole.

Examples of the imidazoline compound include 2-methylimidazoline (dissociation temperature 110° C.) and 2-phenylimidazoline.

Examples of the pyrimidine compound include 2-methyl-1,4,5,6-tetrahydropyrimidine.

Examples of the guanidine compound include 3,3-dialkylguanidine such as 3,3-dimethylguanidine, 1,1,3,3-tetraalkylguanidine such as 1,1,3,3-tetramethylguanidine (dissociation temperature 120° C.), and 1,5,7-triazabicyclo[4.4.0]deca-5-ene.

These first blocking agents may be used singly or in combination of two or more.

For the first blocking agent, preferably, a first blocking agent in which R1 to R3 represent an alkyl group having 1 to 12 carbon atoms or a hydrogen atom, at least one of R1 to R3 represents a hydrogen atom, and R4 represents —NR$^5$R$^6$ (R5 and R6 represent alkyl group having 1 to 12 carbon atoms), and more preferably, a guanidine compound is used, even more preferably 1,1,3,3-tetraalkylguanidine is used, and particularly preferably 1,1,3,3-tetramethylguanidine is used.

Use of such a first blocking agent improves low temperature curing properties and pot life.

The first blocking agent has a dissociation temperature of, for example, 60° C. or more, preferably 80° C. or more, and for example, 150° C. or less, preferably 130° C. or less.

The dissociation temperature of the blocking agent can be measured by the method below.

That is, the dissociation temperature of the blocking agent can be measured by applying the blocked isocyanate onto a silicon wafer, and while heating, observing the temperature at which the isocyanate group regenerates by IR measurement. When the blocking agent has a high catalyst performance (described later), and the regenerated isocyanate group cannot be observed, the dissociation temperature of the blocking agent can be measured by mixing the blocked isocyanate with the polyol compound (described later) used when the coating composition and the adhesive composition described later are prepared, applying the mixture on the silicon wafer, and observing the temperature at which the hydroxyl group of the polyol compound reacts by IR measurement while heating.

The second blocking agent is a blocking agent that inactivates the isocyanate group by blocking, while after the de-blocking, regenerate the isocyanate group. Furthermore, the second blocking agent is a blocking agent that does not have a catalysis activity (described later) to an extent that activates the regenerated isocyanate group, or even it has the catalysis activity (described later) to the extent that activates the regenerated isocyanate group, the catalysis activity (described later) is smaller than that of the above-described first blocking agent.

Examples of the second blocking agent include, to be specific, an alcohol compound, a phenol compound, an active methylene compound, an amine compound, an imine compound, an oxime compound, a carbamic acid compound, a urea compound, an acid amide (lactam) compound, an acide imide compound, a triazole compound, a pyrazole compound, a mercaptan compound, and bisulfite.

Examples of the alcohol compound include methanol, ethanol, 2-propanol, n-butanol, s-butanol, 2-ethylhexylalcohol, 1- or 2-octanol, cyclohexylalcohol, ethylene glycol, benzylalcohol, 2,2,2-trifluoroethanol, 2,2,2-trichloroethanol, 2-(hydroxymethyl) furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetamide, N-hydroxysuccinimide, N-morpholineethanol, 2,2-dimethyl-1,3-dioxolane-4-methanol, 3-oxazolidineethanol, 2-hydroxymethylpyridine (dissociation temperature 140° C.), furfuryl alcohol, 12-hydroxystearic acid, triphenylsilanol, and 2-hydroxyethyl methacrylate.

Examples of the phenol compound include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphcnol, isopropylcresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methylsalicylate, 4-hydroxybenzoic acid methyl ester, 4-hydroxybenzoic acid benzyl ester, hydroxybenzoic acid 2-ethylhexyl ester, 4-[(dimethylamino) methyl]phenol, 4-[(dimethylamino) methyl] nonylphenol, bis(4-hydroxyphenyl) acetic acid, 2-hydroxypyridine (dissociation temperature 80° C.), 2- or 8-hydroxyquinoline, 2-chloro-3-pyridinol, and pyridine-2-thiol (dissociation temperature 70° C.).

Examples of the active methylene compound include Meldrum's acid, dialkyl malonate (e.g., dimethyl malonate, diethyl malonate, di n-butyl malonate, di-t-butyl malonate, di 2-ethylhexyl malonate, methyl n-butyl malonate, ethyl n-butyl malonate, methyl s-butyl malonate, ethyl s-butyl malonate, methyl t-butyl malonate, ethyl t-butyl malonate, diethyl methylmalonate, dibenzyl malonate, diphenyl malonate, benzylmethyl malonate, ethylphenyl malonate, t-butylphenyl malonate, isopropylidene malonate, etc.), alkyl acetoacetate (e.g., methyl acetoacetate, ethyl acetoacetate, n-propyl acetoacetate, isopropyl acetoacetate, n-butyl acetoacetate, t-butyl acetoacetate, benzyl acetoacetate, phenyl acetoacetate, etc.), 2-acetoacetoxyethyl methacrylate, acetylacetone, and cyanoethyl acetate.

Examples of the amine compound include dibutylamine, diphenylamine, aniline, N-methylaniline, carbazole, bis(2,2,6,6-tetramethylpiperidinyl) amine, di-n-propylamine, diisopropylamine (dissociation temperature 130° C.), isopropylethylamine, 2,2,4-, or, 2,2,5-trimethylhexamethyleneamine, N-isopropylcyclohexylamine (dissociation temperature 140° C.), dicyclohexylamine (dissociation temperature 130° C.), bis(3,5,5-trimethylcyclohexyl) amine, piperidine, 2,6-dimethylpiperidine (dissociation temperature 130° C.), t-butylmethylamine, t-butylethylamine (dissociation temperature 120° C.), t-butylpropylamine, t-butylbutylamine, t-butylbenzylamine (dissociation temperature 120° C.), t-butylphenylamine, 2,2,6-trimethylpiperidine, 2,2,6,6-tetramethylpiperidine (dissociation temperature 80° C.), (dimethylamino)-2,2,6,6-tetramethylpiperidine, 2,2,6,6-tetramethyl-4-piperidine, 6-methyl-2-piperidine, and 6-aminocaproic acid.

Examples of the imine compound include ethylene-imine, polyethylene-imine, 1,4,5,6-tetrahydropyrimidine, and guanidine.

Examples of the oxime compound include formaldoxime, acetaldoxime, acetoxime, methylethylketoxime (dissociation temperature 130° C.), cyclohexanoneoxime, diacetyl monoxime, benzophenone oxime, 2,2,6,6-tetramethylcyclohexanoneoxime, diisopropylketoneoxime, methylt-butylketoneoxime, diisobutylketoneoxime, methylisobutylketoneoxime, methylisopropylketoneoxime, methyl 2,4-dimethylpentylketoneoxime, methyl 3-ethylheptylketoneoxime, methylisoamylketoneoxime, n-amylketoneoxime, 2,2,4,4-tetramethyl-1,3-cyclobutanedionemonooxime, 4,4'-dimethoxybenzophenoneoxime, and 2-heptanoneoxime.

Examples of the carbamic acid compound include N-phenyl phenyl carbamate.

Examples of the urea compound include urea, thiourea, and ethylene urea.

Examples of the acid amide (lactam) compound include acetanilid, N-methylacetamide, acetic acid amide, ε-caprolactam, δ-valerolactam, γ-butyrolactam, pyrrolidone, 2,5-piperazinedione, and laurolactam.

Examples of the acid imide compound include succinic acid imide, maleic acid imide, and phthal imide.

Examples of the triazole compound include 1,2,4-triazole and benzotriazole.

Examples of the pyrazole compound include pyrazole, 3,5-dimethylpyrazole (dissociation temperature 120° C.), 3,5-diisopropylpyrazole, 3,5-diphenylpyrazole, 3,5-di-t-butylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole.

Examples of the mercaptan compound include butylmercaptan, dodecylmercaptan, and hexylmercaptan.

Examples of the bisulfate include sodium bisulfate.

Examples of the second blocking agent also include other blocking agents such as benzoxazolone, isatoic acid anhydride, and tetrabutylphosphonium acetate, without limitation to the above-described examples.

Examples of the second blocking agent having catalysis activity (described later) that activates the isocyanate group include the blocking agent represented by the above-described general formula (1), to be specific, for example, the above-described imidazole compound, the above-described imidazoline compound, the above-described pyrimidine compound, and the above-described guanidine compound.

When the blocking agent represented by the above-described general formula (1) is used as the second blocking agent, a blocking agent having a lower catalysis activity (described later) that activates the isocyanate group than that of the first blocking agent is selected.

These second blocking agents may be used singly or in a combination of two or more.

For the second blocking agent, preferably, amine compounds (even more preferably, diisopropylamine, 2,6-dimethylpiperidine, t-butylethylamine, and t-butylbenzylamine), oxime compounds (even more preferably, methylethylketoxime), acid amide compounds (even more preferably, ε-caprolactam), pyrazole compounds (more preferably 3,5-dimethylpyrazole), imidazole compounds (even more preferably, imidazole) are used, and particularly preferably, t-butylethylamine, t-butylbenzylamine, methylethylketoxime, 3,5-dimethylpyrazole, and imidazole are used.

Furthermore, for the second blocking agent, preferably, a second blocking agent having no catalysis activity (described later) to an extent that activates an isocyanate group is used, to be specific, amine compounds (even more preferably, diisopropylamine, 2,6-dimethylpiperidine, t-butylethylamine, and t-butylbenzylamine), oxime compounds (even more preferably, methylethylketooxime), acid amide compounds (even more preferably, ε-caprolactam), pyrazole compounds (more preferably 3,5-dimethylpyrazole), and particularly preferably, t-butylethylamine, t-butylbenzylamine, methylethylketooxime, and 3,5-dimethylpyrazole are used.

The second blocking agent has a dissociation temperature of for example, 150° C. or less, preferably 140° C. or less, more preferably 130° C. or less, and usually 60° C. or more.

When the dissociation temperature is in the above-described range, low temperature curing properties and pot life can be improved.

For the combination of the first blocking agent and the second blocking agent, in view of low temperature curing properties, preferably, the first blocking agent is 1,1,3,3-tetraalkylguanidine, and the second blocking agent is at least one selected from the group consisting of diisopropylamine, 2,6-dimethylpiperidine, t-butylethylamine, t-butylbenzylamine, methylethylketoxime, ε-caprolactam, 3,5-dimethylpyrazole, and imidazole, and particularly preferably, the second blocking agent is at least one selected from the group consisting of diisopropylamine, 2,6-dimethylpiperidine, t-butylethylamine, t-butylbenzylamine, methylethylketoxime, ε-caprolactam, and 3,5-dimethylpyrazole.

The blocked isocyanate can be produced by allowing the above-described polyisocyanate compound to react with the first blocking agent and the second blocking agent.

The sequence of the reaction in this method is not particularly limited, and for example, the following can be performed: first, the polyisocyanate compound is allowed to react with the first blocking agent at a ratio that allows the free-state isocyanate group to remain, and thereafter, the blocked isocyanate having the free-state isocyanate group is allowed to react with the second blocking agent.

Furthermore, for example, the following can also be performed: first, the polyisocyanate compound is allowed to react with the second blocking agent at a ratio that allows the free-state isocyanate group to remain, and thereafter, the blocked isocyanate having the free-state isocyanate group is allowed to react with the first blocking agent.

The polyisocyanate compound can be allowed to react with the first blocking agent and the second blocking agent simultaneously as well.

Preferably, first, the polyisocyanate compound is allowed to react with the second blocking agent at a ratio that allows for the free-state isocyanate groups to remain.

In this case, the equivalent ratio (active group/isocyanate group) of the active group that reacts with the isocyanate group in the second blocking agent relative to the isocyanate group of the polyisocyanate compound is, for example, 0.2 or more, preferably 0.5 or more, and for example, 1.5 or less, preferably 1.2 or less, more preferably 1.1 or less.

The reaction conditions are as follows: for example, at atmospheric pressure, under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hours or more, and for example, 24 hours or less, preferably 12 hours or less.

The blocked isocyanate in which free-state isocyanate groups remain is produced in this manner.

Next, in this method, the blocked isocyanate having the free-state isocyanate group produced as described above is allowed to react with the first blocking agent.

In this case, the equivalent ratio (active group/isocyanate group) of the active group that reacts with the isocyanate group in the first blocking agent relative to the free-state isocyanate group of the blocked isocyanate is, for example, 0.01 or more, preferably 0.05 or more, and for example, 1.3 or less, preferably 1.2 or less, more preferably 1.1 or less.

The reaction conditions are as follows: for example, at atmospheric pressure, and under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hours or more, and for example, 24 hours or less, preferably 12 hours or less.

The completion of the reaction can be determined by, for example, checking disappearance or decrease of the isocyanate groups using infrared spectroscopic analysis.

In this reaction, the ratios of the first blocking agent and the second blocking agent are set suitably so that the first latent isocyanate group (described later) content and the second latent isocyanate group (described later) content in the blocked isocyanate are in a predetermined range to be described later.

The above-described reactions can be performed, for example, with no solvent or in the presence of a solvent.

Examples of the solvent include ketones such as acetone, methyl ethyl ketone, methylisobutylketone, and cyclohexanone; nitriles such as acetinitrile; alkylesters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycol etheresters such as methylcellosolveacetate, ethylcellosolveacetate, methylcarbitolacetate, ethylcarbitolacetate, ethylene glycol ethyletheracetate, propylene glycol methyletheraeetate, 3-methyl-3-methoxybutylacetate, and ethyl-3-ethoxypropionate; ethers such as diethylether, tetrahydrofuran, dioxane, 1,2-dimethoxyethane, diethylene glycol dimethylether, diethylene glycol diethylether, dipropylene glycol dimethylether, and dipropylene glycol diethylether; halogenated aliphatic hydrocarbons such as methyl chloride, methylene chloride, chloroform, carbon tetrachloride, methyl bromide, methylene iodide, and dichloroethane; polar aprotic solvents such as N-methylpyrrolidone, dimethylformamide, N,N'-dimethylacetamide, dimethyl sulfoxide, and hexamethylphosphonylamide; and furthermore, propylene glycol 1-monomethylether 2-acetate.

Examples of the solvent also include plasticizers.

Examples of the plasticizer include phthalic acid plasticizers, fatty acid plasticizers, aromatic polycarboxylic acid plasticizers, phosphoric acid plasticizers, polyol plasticizers, epoxy plasticizers, and polyester plasticizers.

Examples of the phthalic acid plasticizers include phthalic acid ester plasticizers such as dimethylphthalate, diethylphthalate, dibutylphthalate, diisobutylphthalate, dihexylphthalate, diheptylphthalate, di-(2-ethylhexyl) phthalate, di-n-octylphthalate, dinonylphthalate, diisononylphthalate, didecylphthalate, diisodecylphthalate, ditridecylphthalate, diundecylphthalate, dilaurylphthalate, distearylphthalate, diphenylphthalate, dibenzylphthalate, butylbenzylphthalate, dicyclohexylphthalate, octyldecylphthalate, dimethylisophthalate, di-(2-ethylhexyl) isophthalate, and diisooctylisophthalate; and tetrahydrophtalic acid ester plasticizers such as di-(2-ethylhexyl) tetrahydrophthalate, di-n-octyltetrahydrophthalate, and diisodecyltetrahydrophthalate.

Examples of the fatty acid plasticizers include adipic acid plasticizers such as di-n-butyladipate, di-(2-ethylhexyl) adipate, diisodecyladipate, diisononyladipate, di (C6-C10 alkyl) adipate, and dibutyldiglycoladipate; azelaic acid plasticizers such as di-n-hexylazelate, di-(2-ethylhexyl) azelate, and diisooctylazelate; sebacic acid plasticizers such as di-n-butylsebacate, di-(2-ethylhexyl) sebacate, and diisononylsebacate; maleic acid plasticizers such as dimethylmalate, diethylmalate, di-n-butylmalate, and di-(2-ethylhexyl) malate; fumaric acid plasticizers such as di-n-butylfumarate and di-(2-ethylhexyl) fumarate; itaconic acid plasticizers such as monomethylitaconate, monobutylitaconate, dimethylitaconate, diethylitaconate, dibutylitaconate, and di-(2-ethylhexyl) itaconate; stearic acid plasticizers such as n-butylstearate, glycerinmonostearate, and diethylene glycol distearate; oleic acid plasticizers such as butyl oleate, glyceryl monooleate, and diethylene glycol monooleate; citric acid plasticizers such as triethyl citrate, tri-n-butyl citrate, acetyltriethyl citrate, acetyltributyl citrate, and acetyltri-(2-ethylhexyl) citrate; ricinoleic acid plasticizers such as methylacetyl ricinoleate, butylacetyl ricinoleate, glyceryl mono ricinoleate, and diethylene glycol mono ricinoleate; other fatty acid plasticizers such as diethylene glycol monolaurate, diethylene glycol dipelargonate, and pentaerythritol fatty acid ester.

Examples of the aromatic polycarboxylic acid plasticizers include trimellitic acid plasticizers such as tri-n-hexyltrimellitate, tri-(2-ethylhexyl) trimellitate, tri-n-octyltrimellitate, triisooctyltrimellitate, triisononyltrimellitate, tridecyltrimellitate, and triisodecyltrimellitate; and pyromellitic acid plasticizers such as tetra-(2-cthylhexyl) pyromellitate, and tetra-n-octyl pyromellitate.

Examples of the phosphoric acid plasticizers include triethyl phosphate, tributyl phosphate, tri-(2-ethylhexyl) phosphate, tributoxyethyl phosphate, triphenyl phosphate, octyldiphenyl phosphate, cresyl diphenyl phosphate, cresyl phenyl phosphate, tricresyl phosphate, trixylenyl phosphate, tris (chloroethyl) phosphate, tris (chloropropyl) phosphate, tris (dichloropropyl) phosphate, and tris (isopropylphenyl) phosphate.

Examples of the polyol plasticizer include glycol plasticizers such as diethylene glycol dibenzoate, dipropylene glycol dibenzoate, triethylene glycol dibenzoate, triethylene glycol di-(2-ethylbutyrate), triethylene glycol di-(2-ethylhexoate), and dibutylmethylenebisthioglycolate; and glycerin plasticizers such as glycerol monoacetate, glycerol triacetate, and glycerol tributyrate.

Examples of the epoxy plasticizers include epoxidized soybean oil, epoxy butylstearate, epoxy hexahydrophthalic acid di 2-ethylhexyl, epoxy hexahydrophthalic acid di isodecyl, epoxy triglyceride, epoxidized octyl oleate, and epoxidized decyl oleate.

Examples of the polyester plasticizer include adipic acid polyesters, sebacic acid polyesters, and phthalic acid polyesters.

Examples of the plasticizers also include, in addition, partially hydrogenated terphenyl, adhesive plasticizers, and furthermore, polymerizable plasticizers such as diallyl phthalate, and acrylic monomer and oligomer. These plasticizers may be used singly or in combination of two or more.

These solvents may be used singly or in combination of two or more.

In this manner, a blocked isocyanate in which isocyanate groups of the polyisocyanate compound are blocked with the first blocking agent and the second blocking agent can be produced.

Such a blocked isocyanate contains both of a first latent isocyanate group that is an isocyanate group blocked with a first blocking agent and a second latent isocyanate group that is an isocyanate group blocked with a second blocking agent in one molecule.

The first latent isocyanate group content and the second latent isocyanate group content are as follows: the first latent isocyanate group content relative to a total amount in mol of the first latent isocyanate group and the second latent isocyanate group is, for example, 1 mol % or more, preferably 5 mol % or more, more preferably 10 mol % or more, and for example, 80 mol % or less, preferably 50 mol % or less, more preferably 30 mol % or less. The second latent isocyanate group content relative to a total amount in mol of the first latent isocyanate group and the second latent isocyanate group is, for example, 20 mol % or more, preferably 50 mol % or more, more preferably 70 mol % or more, and for example, 98 mol % or less, preferably 95 mol % or less, more preferably 90 mol % or less.

The first latent isocyanate group content and the second latent isocyanate group content within the above-described range improve the low temperature curing properties and pot life.

Furthermore, such a blocked isocyanate can be prepared as, for example, a non-water dispersed blocked isocyanate, and for example, can be used by being dissolved in the above-described solvent.

When the blocked isocyanate is dissolved in a solvent, the solid content concentration thereof is, for example, 1 mass % or more, preferably 20 mass % or more, more preferably 30 mass % or more, and for example, 95 mass % or less, preferably 90 mass % or less.

Furthermore, such a blocked isocyanate can be dispersed, for example, in water and used. In such a case, in view of water dispersiveness, preferably, the blocked isocyanate is modified by a hydrophilic compound containing an active hydrogen group. In this manner, a water dispersive blocked isocyanate can be produced.

To be more specific, to produce a water dispersive blocked isocyanate, for example, first, the above-described polyisocyanate compound is allowed to react with the hydrophilic compound containing an active hydrogen group to prepare a hydrophilic group-containing polyisocyanate.

Examples of the hydrophilic compound containing an active hydrogen group (hereinafter may be referred to as active hydrogen group-containing hydrophilic compound) include an active hydrogen group-containing nonionic hydrophilic compound, an active hydrogen group-containing anionic hydrophilic compound, and an active hydrogen group-containing cationic hydrophilic compound (e.g., quaternary amino group-containing active hydrogen compound, etc.), and preferably, an active hydrogen group-containing nonionic hydrophilic compound, and an active hydrogen group-containing anionic hydrophilic compound are used.

Examples of the active hydrogen group-containing nonionic hydrophilic compound include a polyoxyethylene compound having at least three continuous ethylene oxide groups.

Examples of such a polyoxyethylene compound include a polyoxyethylene group-containing polyol, a polyoxyethylene group-containing polyamine, one-end-capped polyoxyethylene glycol, and one-end-capped polyoxyethylene diamine.

The polyoxyethylene group-containing polyol is a compound having a polyoxyethylene group in its molecule and at the same time having two or more hydroxyl groups, and examples thereof include polyoxyethylene glycol, polyoxyethylenetriol, and a random and/or block copolymer (e.g., polyoxypropylene polyoxyethylene copolymer diol or triol, polyoxypropylene polyoxyethylene block polymer diol or triol, Pluronic polypropylene glycol or triol in which ethyleneoxide is addition polymerized at polypropylene glycol terminal, etc.) of alkylene oxides such as ethylene oxide and propylene oxide.

Examples of the polyoxyethylene group-containing polyol further include a polyoxyethylene side chain-containing polyol having two or more hydroxyl groups at molecular terminals and having a polyoxyethylene group at its side chain.

The polyoxyethylene side chain-containing polyol can be produced as follows: for example, first, diisocyanate (the above-described diisocyanate) and one-end-capped polyoxyethylene glycol (described later) are subjected to urethane-forming reaction at a ratio such that the isocyanate group of diisocyanate is in excess relative to the hydroxyl group of the one-end-capped polyoxyethylene glycol (described later), and thereafter, as necessary, unreacted diisocyanate is removed, thereby synthesizing polyoxyethylene chain-containing monoisocyanate, and then the polyoxyethylene chain-containing monoisocyanate and dialkanolamine (C1 to 20 dialkanolamine) are subjected to urea-forming reaction.

In the preparation of the polyoxyethylene side chain-containing polyol, for the one-end-capped polyoxyethylene glycol (described later), preferably, methoxyethylene glycol is used, and for diisocyanate, preferably, aliphatic diisocyanate (e.g., HDI) is used, and for dialkanolamine, diethanolamine is used.

Examples of the polyoxyethylene side chain-containing polyol also include polyoxyethylene side chain-containing polyol produced by adding one-end-capped polyoxyethylene glycol (described later) to one hydroxyl group of trihydric alcohol such as trimethylolpropane.

Examples of the polyoxyethylene group-containing polyamine include polyoxyalkylene ether diamine such as polyoxyethylene etherdiamine.

Examples of the one-end-capped polyoxyethylene glycol include alkoxyethylene glycol (monoalkoxypolyethylene glycol) in which one end is capped with an alkyl group.

In monoalkoxypolyethylene glycol, the number of carbon atoms of the alkyl group for capping the one end is, for example, 1 to 20, preferably 1 to 8, more preferably 1 to 6, further preferably 1 to 4, particularly preferably 1 to 2. That is, for the alkyl group for capping the one end, preferably, a methyl group and an ethyl group are used.

For the monoalkoxypolyethylene glycol in which one end is capped with an alkyl group, to be specific, methoxypolyethylene glycol, ethoxypolyethylene glycol are used, and preferably, methoxypolyethylene glycol is used.

Examples of the one-end-capped polyoxyethylene diamine include, for example, polyoxyethylene diamine (monoaminomonoalkoxypolyoxyethylene) in which one end is capped with an alkoxy group having 1 to 20 carbon atoms is used.

These polyoxyethylene compounds may be used singly or in combination of two or more.

For the polyoxyethylene compound, preferably, polyoxyethylene side chain-containing polyol having two or more hydroxyl groups at molecular terminals and having polyoxyethylene group at its side chain, polyoxyethylene glycol, monoalkoxypolyethylene glycol, monoaminomonoalkoxypolyoxyethylene diamine are used, more preferably, polyoxyethylene side chain-containing polyol having two or more hydroxyl groups at molecular terminals and having polyoxyethylene group at its side chain, and monoalkoxypolyethylene glycol are used.

Use of the polyoxyethylene side chain-containing polyol having two or more hydroxyl groups at molecular terminals and having polyoxyethylene group at its side chain increases the number of the functional group per one molecule, and therefore water resistance of a cured coating of the coating composition and the adhesive composition produced by using the blocked isocyanate can be improved.

Furthermore, use of monoalkoxypolyethylene glycol allows for control of viscosity, and improvement in water dispersiveness.

The polyoxyethylene compound may contain oxyalkylene groups other than ethylene oxide group, to be specific, may contain oxypropylene group and oxystyrene group. In such a case, the mole ratio of the ethylene oxide group relative to the total amount of the polyoxyethylene compound is, in view of water dispersiveness, for example, 60 mol % or more, preferably 70 mol % or more, more preferably 80 mol % or more.

The polyoxyethylene compound can be a commercially available product, to be specific, for example, for polyoxyethylene glycol, PEG200, PEG300, PEG400, PEG600, PEG1000, PEG2000 (all manufactured by NOF Corporation) are used, and for monomethoxypolyoxyethylene glycol, for example, methoxy PEG#400, methoxy PEG#550, methoxy PEG#1000 (all manufactured by TOHO Chemical Industry Co., Ltd.), UNIOX M400, UNIOX M550, UNIOX M1000, UNIOX M2000 (all manufactured by NOF Corporation), MPG-081 (Nippon Nyukazai Co, Ltd.), and furthermore, for polyoxyethyleneetherdiamine, Jeffamine series (manufactured by Huntsman International LLC.) are used.

These active hydrogen group-containing nonionic hydrophilic compounds may be used singly or in combination of two or more.

The active hydrogen group-containing nonionic hydrophilic compound (including polyoxyethylene compound) has a number average molecular weight of, for example, 200 or more, preferably 300 or more, more preferably 400 or more, and for example, 2000 or less, preferably 1500 or less, more preferably 1200 or less, more preferably 1000 or less.

The active hydrogen group-containing nonionichydrophilic compound having a number average molecular weight of the above-described lower limit or more allows for improvement in water dispersiveness of blocked isocyanate. When the active hydrogen group-containing nonionic hydrophilic compound has a number average molecular weight of the above-described upper limit or less, solubility of the blocked isocyanate can be improved, and furthermore, water resistance of the cured coating of the coating composition and the adhesive composition produced by using the blocked isocyanate can be improved.

Examples of the active hydrogen group-containing anionic hydrophilic compound include a carboxylic acid group-containing active hydrogen compound and a sulfonic acid group-containing active hydrogen compound.

Examples of the carboxylic acid group-containing active hydrogen compound include monohydroxycarboxylic acid and a derivative thereof and dihydroxycarboxylic acid and a derivative thereof.

For the monohydroxycarboxylic acid, to be specific, for example, hydroxyl pivalic acid is used.

Examples of dihydroxy carboxylic acid include, to be specific, dihydroxyl carboxylic acid such as 2,2-dimethylolacetic acid, 2,2-dimethylollactic acid, 2,2-dimethylolpropionic acid (hereinafter DMPA.), 2,2-dimethylolbutanoic acid (hereinafter DMBA.), 2,2-dimethylolbutyric acid, and 2,2-dimethylolvaleric acid.

Examples of the monohydroxycarboxylic acid or dihydroxycarboxylic acid derivative include metal salts or ammonium salts of the above-described monohydroxycarboxylic acid or dihydroxycarboxylic acid, and furthermore, poly (caprolactone) diol and polyether polyol produced by using the above-described monohydroxycarboxylic acid or dihydroxycarboxylic acid as an initiator.

For the carboxylic acid group-containing active hydrogen compound, preferably, monohydroxycarboxylic acid and dihydroxycarboxylic acid are used, and more preferably, dihydroxycarboxylic acid is used.

Examples of the sulfonic acid group-containing active hydrogen compound include dihydroxybutane sulfonic acid and dihydroxypropane sulfonic acid that are produced from synthesis reaction between an epoxy group-containing compound and acid sulfite. Furthermore, for example, aminoethylsulfonic acid, ethylenediamino-propyl-β-ethylsulfonic acid, 1,3-propylene diamine-β-ethylsulfonic acid, N,N-bis (2-hydroxyethyl)-2-aminoethanesulfonic acid, N,N-bis(2-hydroxyethyl)-2-aminobutanesulfonic acid, 1,3-phenylene-diamine-4,6-disulfonic acid, diaminobutane sulfonic acid, diaminopropane sulfonic acid, 3,6-diamino-2-toluenesulfonic acid, 2,4-diamino-5-toluenesulfonic acid, N-(2-aminoethyl)-2-aminoethanesulfonic acid, 2-aminoethanesulfonic acid, N-(2-aminoethyl)-2-aminobutanesulfonic acid, or metal salts or ammonium salts of these sulfonic acids are used.

These active hydrogen group-containing anionic hydrophilic compounds may be used singly or in a combination of two or more. For the active hydrogen group-containing anionic hydrophilic compound, preferably, in view of ease in production and compatibility with water-based coating, a carboxylic acid group-containing active hydrogen compound is used.

When the active hydrogen group-containing anionic hydrophilic compound is used, after production of the blocked isocyanate, preferably, it is neutralized with a neutralizing agent. Examples of the neutralizing agent include alkali metals, alkaline earth metals, ammonias, and tertiary amines such as trimethylamine, triethylamine, dimethylethanolamine, triethanol amine, and triisopropanolamine.

These active hydrogen group-containing hydrophilic compounds may be used singly or in combination of two or more. For the active hydrogen group-containing hydrophilic compound, preferably, in view of ease in production, the active hydrogen group-containing nonionic hydrophilic compound is used, and more preferably, a polyoxyethylene compound is used.

When the active hydrogen group-containing nonionic hydrophilic compound is used as the active hydrogen group-containing hydrophilic compound, compatibility can be improved when mixed with other resin (main component relative to the blocked isocyanate as the curing agent, etc.), and can be mixed and used with various resins.

Furthermore, in view of water resistance of cured coating of the coating composition and the adhesive composition produced by using blocked isocyanate as the active hydrogen group-containing hydrophilic compound, preferably, the above-described monohydroxycarboxylic acid or its derivative, and dihydroxycarboxylic acid or its derivative are used.

Then, by allowing these polyisocyanate compounds to react with the active hydrogen group-containing hydrophilic compound, a hydrophilic group-containing polyisocyanate can be produced.

In preparation of the hydrophilic group-containing polyisocyanate, the mixing ratio of the active hydrogen group-containing hydrophilic compound relative to the polyisocyanate compound is, relative to 100 mol of the isocyanate group of the polyisocyanate compound, the active hydrogen group of the active hydrogen group-containing hydrophilic compound is adjusted to be 2 mol or more, preferably 3 mol or more, more preferably 5 mol or more, and 25 mol or less, preferably 22 mol or less, more preferably 20 mol or less.

When the mixing ratio of the active hydrogen group-containing hydrophilic compound relative to the polyisocyanate compound is the above-described lower limit or more, dispersiveness in water can be improved, and when the mixing ratio of the active hydrogen group-containing hydrophilic compound relative to the polyisocyanate compound is the above-described upper limit or less, the particle size when dispersed in water can be kept suitably, a long pot life can be obtained, and furthermore, can be used as a curing agent component for one-component polyurethane resin.

The mixing ratio of the active hydrogen group-containing hydrophilic compound to the polyisocyanate compound is, to be more specific, as follows: the active hydrogen group-containing hydrophilic compound relative to 100 parts by mass of the polyisocyanate compound is, for example, 3 parts by mass or more, preferably 5 parts by mass or more, and for example, 100 parts by mass or less, preferably 80 parts by mass or less.

The reaction conditions are as follows: for example, at atmospheric pressure, the reaction temperature of, for example, 0° C. or more, preferably 30° C. or more, and for example, 150° C. or less, preferably 120° C. or less. The reaction time is until there is no change in the isocyanate amount measured by titrimetry at the above-described reaction temperature, to be specific, for example, 0.5 hours or more, preferably 1 hour or more, and for example, 120 hours or less, preferably 72 hours or less.

The polyisocyanate compound can be allowed to react with the active hydrogen group-containing hydrophilic compound with no solvent, but can also be reacted, for example, in the presence of the above-described known solvent.

In this manner, a hydrophilic group-containing polyisocyanate in which a portion of the isocyanate group of the polyisocyanate compound is allowed to react with the active hydrogen group of the active hydrogen group-containing hydrophilic compound, and also the remaining portion of the isocyanate group is in free-state can be produced.

The hydrophilic group-containing polyisocyanate has an isocyanate group content (when containing solvent, based on resin excluding the solvent) of, for example, 5 mass % or more, preferably 7 mass % or more, and for example, 25 mass % or less, preferably 20 mass % or less.

When the polyoxyethylene compound is used as the active hydrogen group-containing hydrophilic compound, the hydrophilic group-containing polyisocyanate has an ethylene oxide group content (that is, the ethylene oxide group relative to a total of the polyisocyanate compound and the hydrophilic compound) of, for example, 7 mass % or more, preferably 10 mass % or more, and for example, 30 mass % or less, preferably 25 mass % or less.

When the ethylene oxide group content is the above-described lower limit or more, excellent water dispersiveness can be achieved, and furthermore, when the ethylene oxide group content is the above-described upper limit or less, a long pot life can be achieved, and furthermore, it can be used as a curing agent component for a one-component polyurethane resin, and furthermore, physical properties of the obtained coating of the cured coating composition and adhesive composition can be improved.

Then, by allowing the hydrophilic group-containing polyisocyanate to react with the blocking agent so as to block the isocyanate group of the hydrophilic group-containing polyisocyanate produced as described above, a blocked isocyanate can be produced.

Then, the blocked isocyanate can be produced, for example, by allowing the above-described hydrophilic group-containing polyisocyanate to react with the first blocking agent and the second blocking agent.

In this reaction, the ratios of the first blocking agent and the second blocking agent are suitably set so that the first latent isocyanate group content and the second latent isocyanate group content in the blocked isocyanate are in a predetermined range described later.

The sequence of the reaction is not particularly limited, and for example, first, the hydrophilic group-containing polyisocyanate is allowed to react with the first blocking agent at a ratio that allows for the free-state isocyanate groups to remain, and thereafter, the blocked isocyanate having the free-state isocyanate group is allowed to react with the second blocking agent.

Furthermore, for example, first, the hydrophilic group-containing polyisocyanate is allowed to react with the second blocking agent at a ratio that allows for the free-state isocyanate groups to remain, and thereafter, the blocked isocyanate having the free-state isocyanate group and the first blocking agent are allowed to react.

Furthermore, the hydrophilic group-containing polyisocyanate can be allowed to react with the first blocking agent and the second blocking agent simultaneously.

Preferably, first, the hydrophilic group-containing polyisocyanate is allowed to react with the second blocking agent at a ratio that allows for free-state isocyanate groups to remain.

In such a case, the equivalent ratio (active group/isocyanate group) of the active group that reacts with the isocyanate group in the second blocking agent relative to the isocyanate group of the hydrophilic group-containing polyisocyanate is, for example, 0.2 or more, preferably 0.5 or more, and for example, 1.5 or less, preferably 1.2 or less, more preferably 1.1 or less.

The reaction conditions are as follows: for example, at atmospheric pressure, and under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hour or more, and for example, 24 hours or less, preferably 12 hours or less.

In this manner, the blocked isocyanate in which the free-state isocyanate groups remain is produced.

Next, in this method, the blocked isocyanate having the free-state isocyanate group is allowed to react with the first blocking agent.

In such a case, the equivalent ratio (active group/isocyanate group) of the active group that reacts with the isocyanate group in the first blocking agent relative to the free-state isocyanate group of the blocked isocyanate is, for example, 0.01 or more, preferably 0.05 or more, for example, 1.3 or less, preferably 1.2 or less, more preferably 1.1 or less.

The reaction conditions are as follows: for example, at atmospheric pressure, and under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hour or more, and for example, 24 hours or less, preferably 12 hours or less.

The completion of the reaction can be determined by, for example, checking disappearance or decrease of the isocyanate groups using infrared spectroscopic analysis.

The above-described reaction can be performed, for example, with no solvent or in the presence of a solvent.

In this manner, the blocked isocyanate in which the isocyanate group of the hydrophilic group-containing polyisocyanate is blocked with the first blocking agent and the second blocking agent can be produced.

In such a blocked isocyanate, the first latent isocyanate group that is an isocyanate group blocked with a first blocking agent and the second latent isocyanate group that is an isocyanate group blocked with a second blocking agent are both present in one molecule.

The first latent isocyanate group content and the second latent isocyanate group content are as follows: the first latent isocyanate group content relative to a total amount in mol of these is, for example, 1 mol % or more, preferably 5 mol % or more, more preferably 10 mol % or more, and for example, 80 mol % or less, preferably 50 mol % or less, more preferably 30 mol % or less. The second latent isocyanate group content relative to a total amount in mol of these is, for example, 20 mol % or more, preferably 50 mol % or more, more preferably 70 mol % or more, and for example, 98 mol % or less, preferably 95 mol % or less, more preferably 90 mol % or less.

The first latent isocyanate group content and the second latent isocyanate group content within the above-described range allows for improvement in low temperature curing properties and pot life.

In the description above, first, the polyisocyanate compound is allowed to react with the hydrophilic compound containing an active hydrogen group, and the isocyanate group of the produced hydrophilic group-containing polyisocyanate is blocked with the first blocking agent and the second blocking agent to prepare a blocked isocyanate.

However, the reaction sequence for the polyisocyanate compound, hydrophilic compound, first blocking agent, and second blocking agent is not particularly limited, and for example, first, the polyisocyanate compound is allowed to react with the first blocking agent and the second blocking agent, and the produced blocked isocyanate (including unreacted isocyanate group) is allowed to react with the hydrophilic compound to prepare a blocked isocyanate.

In view of blocking agent decomposition, side reaction, and water dispersiveness of the blocked isocyanate, preferably, the polyisocyanate compound is allowed to react with the hydrophilic compound containing an active hydrogen group first to prepare the hydrophilic group-containing polyisocyanate, and the isocyanate group of the produced hydrophilic group-containing polyisocyanate is blocked with the first blocking agent and the second blocking agent.

The blocked isocyanate produced in this manner is obtained as a water-dispersed blocked isocyanate, and even when dispersed in water, has a relatively long pot life, and furthermore, can be used as a curing agent component of a one-component polyurethane resin, and also has excellent low temperature curing properties.

The blocked isocyanate can be dispersed in water by a method without limitation, and for example, the blocked isocyanate and water can be stirred and mixed using a mixer such as a homomixer, a homodisper, and a magnetic stirrer.

To the blocked isocyanate dispersion liquid, as necessary, additives such as a dispersing agent and an antifoaming agent can be added. The mixing ratio of the additive is not particularly limited, and can be suitably determined in accordance with purpose and use.

Thereafter, as necessary, when the blocked isocyanate dispersion liquid contains an organic solvent (e.g., when the reaction solution in which the hydrophilic group-containing polyisocyanate, the first blocking agent, and the second blocking agent are allowed to react in an organic solvent is used as is as the blocked isocyanate), the blocked isocyanate dispersion liquid is, for example, subjected to pressure reduction, or heated under reduced pressure, so as to vaporize and remove the organic solvent.

In the blocked isocyanate dispersion liquid thus produced, the blocked isocyanate has a volume average particle size of, for example, 1000 nm or less, preferably 700 nm, more preferably 500 nm or less, even more preferably 300 nm or less, and generally 10 nm or more.

When the blocked isocyanate has a volume average particle size of the above-described upper limit or less, excellent water dispersiveness can be secured, and when the blocked isocyanate has a volume average particle size of the above-described lower limit or more, a relatively long pot life can be ensured, and furthermore, it can be used as a curing agent component for the one-component polyurethane resin.

In the description above, the first latent isocyanate group and the second latent isocyanate group are both present in one molecule of the produced blocked isocyanate, but for example, it is also possible to prepare a blocked isocyanate containing only the first latent isocyanate group as the latent isocyanate group, and a blocked isocyanate containing only the second latent isocyanate group as the latent isocyanate group, and then mix them.

To be more specific, in this method, first, the above-described polyisocyanate compound is allowed to react with the above-described first blocking agent, thereby producing a blocked isocyanate (hereinafter referred to as first blocked isocyanate component) containing only a first latent isocyanate group as the latent isocyanate group.

In such a case, the equivalent ratio (active group/isocyanate group) of the active group that reacts with the isocyanate group in the first blocking agent relative to the isocyanate group of the polyisocyanate compound is, for example, 0.5 or more, preferably 0.8 or more, and for example, 2.0 or less, preferably 1.5 or less, and more preferably 1.25 or less.

The reaction conditions are as follows: for example, at atmospheric pressure, and under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hour or more, and for example, 24 hours or less, preferably 12 hours or less.

The completion of the reaction can be determined by, for example, checking disappearance or decrease of the isocyanate groups using infrared spectroscopic analysis.

The polyisocyanate compound can be allowed to react with the first blocking agent, for example, with no solvent or in the presence of a solvent.

In this manner, a blocked isocyanate in which the isocyanate group of the polyisocyanate compound is blocked only with the first blocking agent, that is, a first blocked isocyanate component can be produced.

Furthermore, in this method, separately from the first blocked isocyanate component, the above-described polyisocyanate compound is allowed to react with the above-described second blocking agent, thereby producing a blocked isocyanate (hereinafter referred to as second blocked isocyanate component) containing only a second latent isocyanate group as the latent isocyanate group.

In such a ease, the equivalent ratio (active group/isocyanate group) of the active group that reacts with the isocyanate group in the second blocking agent relative to the isocyanate group of the polyisocyanate compound is, for example, 0.5 or more, preferably 0.8 or more, and for example, 2.0 or less, preferably 1.5 or less, more preferably 1.25 or less.

The reaction conditions are as follows: for example, at atmospheric pressure, and under an inert gas (e.g., nitrogen gas, argon gas, etc.) atmosphere, the reaction temperature is, for example, 0° C. or more, preferably 20° C. or more, and for example, 80° C. or less, preferably 60° C. or less. The reaction time is, for example, 0.5 hours or more, preferably 1.0 hours or more, and for example, 24 hours or less, preferably 12 hours or less.

The completion of the reaction can be determined by, for example, checking disappearance or decrease of the isocyanate groups using infrared spectroscopic analysis.

The polyisocyanate compound can be allowed to react with the second blocking agent, for example, with no solvent or in the presence of a solvent.

In this manner, a blocked isocyanate in which the isocyanate group of the polyisocyanate compound is blocked only with the second blocking agent, that is, a second blocked isocyanate component can be produced.

Thereafter, in this method, the first blocked isocyanate component is mixed with the second blocked isocyanate component.

The mixing ratio of the first blocked isocyanate component and the second blocked isocyanate component is set so that the first latent isocyanate group content and the second latent isocyanate group content in the blocked isocyanate are in the above-described range.

To be specific, the first blocked isocyanate component is, for example, 1 mol % or more, preferably 5 mol % or more, more preferably 10 mol % or more, and for example, 80 mol % or less, preferably 50 mol % or less, more preferably 30 mol % or less relative to a total in mol of the first blocked isocyanate component and the second blocked isocyanate component. The second blocked isocyanate component is, for example, 20 mol % or more, preferably 50 mol % or more, more preferably 70 mol % or more, and for example, 98 mol % or less, preferably 95 mol % or less, more preferably 90 mol % or less relative to a total in mol of the first blocked isocyanate component and the second blocked isocyanate component.

In this manner, a blocked isocyanate as a mixture of the first blocked isocyanate component and the second blocked isocyanate component can be produced.

Such a blocked isocyanate (mixture) contains a first latent isocyanate group that is an isocyanate group blocked with a first blocking agent and a second latent isocyanate group that is an isocyanate group blocked with a second blocking agent at the above-described proportion.

Such a blocked isocyanate can be dissolved, for example, in the above-described solvent at the above-described proportion and used, and furthermore, for example, can be dispersed in water at the above-described proportion and used.

When the blocked isocyanate is dispersed in water and used, as necessary, the first blocked isocyanate component and/or the second blocked isocyanate component can be modified with the above-described hydrophilic compound with the above-described method.

As described above, the blocked isocyanate of present invention may or may not contain both of the first latent isocyanate group and the second latent isocyanate group in one molecule. In view of low temperature curing properties, preferably, the first latent isocyanate group and the second latent isocyanate group are both present in one molecule.

The above-described blocked isocyanate can be used, for example, as a curing agent component of two-component curing polyurethane resin or one-component polyurethane resin, to be more specific, for example, suitably used as a curing agent in, for example, a coating composition, an ink composition, and an adhesive composition prepared as a two-component curing polyurethane resin or a one-component polyurethane resin.

The coating composition and the adhesive composition of the present invention contain the above-described blocked isocyanate and polyol compound.

Such a coating composition and adhesive composition are prepared, for example, as a two-component polyurethane resin, i.e., a curing agent composed of the above-described blocked isocyanate and a main component composed of a polyol compound are prepared separately, and they are blended at the time of use, or as a one-component polyurethane resin, i.e., a curing agent composed of the above-described blocked isocyanate and a main component composed of the polyol compound are blended in advance.

For the polyol compound, for example, a low molecular-weight polyol and a high molecular weight polyol are used.

The low molecular-weight polyol is a compound having two or more hydroxyl groups and a number average molecular weight of less than 300, preferably less than 400, and examples thereof include dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerol; pentahydric alcohols such as xylitol; hexahydric alcohols such as sorbitol, mannitol, allitol, iditol, dulcitol, altritol, inositol, and dipentaerythritol; heptahydrics such as perseitol; and octahydric alcohols such as sucrose.

These low-molecular-weight polyols may be used singly or in combination of two or more.

The high molecular weight polyol is a compound having two or more hydroxyl groups and a number average molecular weight of 300 or more, preferably 400 or more, more preferably 500 or more, and examples thereof include polyether polyol (e.g., polyoxyalkylene polyol, polytetramethylene ether polyol, etc.), polyester polyol (e.g., adipic acid-based polyesterpolyol, phthalic acid-based polyester polyol, lactone-based polyester polyol, etc.), polycarbonate polyol, polyurethane polyol (e.g., urethane modified polyol in which polyether polyol, polyester polyol, or polycarbonatepolyol is modified with polyisocyanate), epoxy polyol, vegetable oil polyol, polyolefin polyol, acrylic polyol, and vinyl monomer-modified polyol.

These high-molecular weight polyols may be used singly or in combination of two or more.

These polyol compounds may be used singly or in a combination of two or more.

For the polyol compound, preferably, a high molecular weight polyol, more preferably, acrylic polyol is used.

Furthermore, for example, when the blocked polyisocyanate has a high cohesive force, for example, an imidazole compound is used as the first blocking agent and/or second blocking agent, in view of improving dispersiveness, preferably, a polyol compound and a monol compound are used in combination.

Examples of the monol compound include methanol, ethanol, propanol, isopropanol, n-butanol, isobutanol, s-butanol, t-butanol, 2-ethylhexylalcohol, other alkanol (C5 to 38) and aliphatic unsaturated alcohols (C9 to 24), alkenyl alcohol, 2-propene-1-ol, alkadienol (C6 to 8), and 3,7-dimethyl-1,6-octadiene-3-ol.

These monol compounds may be used singly or in combination of two or more.

When the monol compound is blended, the mixing ratio relative to a total amount of the coating composition and the adhesive composition is, for example, 1 mass % or more, preferably 2 mass % or more, and for example, 10 mass % or less, preferably 8 mass % or less.

The polyol compound (as necessary, including monol compound. The same applies to the following) can be used in a massive state (bulk, solid content concentration 100 mass %), but for example, can be used by dissolving or dispersing in water or an organic solvent. In addition, for example, those prepared by using a polymerization method in which the aforementioned polyol compound is dispersed in water such as emulsion polymerization and suspension polymerization can be used. Furthermore, those polyol compounds not dispersed in non-water solvent, or plastisol can be used. Plastisol contains, for example, resin, a plasticizer, and a filler, and examples of the resin include vinyl chloride resin, vinyl acetate copolymer vinyl chloride resin, and acrylic resin.

When the polyol compound is dissolved or dispersed in water or an organic solvent, the solid content concentration is, for example, 1 mass % or more, preferably 5 mass % or more, more preferably 10 mass % or more.

In such a coating composition and adhesive composition, the blocked isocyanate (curing agent) is blended with the polyol compound (main component) in advance or at the time of usage, and the blocking agent (first blocking agent and second blocking agent) is dissociated from the blocked isocyanate.

In blending of the blocked isocyanate (curing agent) and the polyol compound (main component), for example, the blocked isocyanate is dispersed or dissolved in water or solvent to prepare dispersion liquid or solution, and thereafter, a massive (bulk, solid content concentration 100 mass %) polyol compound, dispersion liquid or solution of the polyol compound is blended. Alternatively, for example, the blocked isocyanate can be directly dispersed in a dispersion liquid or solution of the polyol compound by the aforementioned method.

The mixing ratio of the blocked isocyanate (curing agent) to the polyol compound (main component) is, for example, as follows: the equivalent ratio of (isocyanate group/active hydrogen group) the latent isocyanate group (isocyanate group blocked with the blocking agent) of the blocked isocyanate relative to the hydroxyl group of the polyol compound is, for example, 0.05 or more, preferably 0.1 or more, more preferably 0.2 or more, and for example, 5 or less, preferably 3 or less, and more preferably 2 or less.

In preparation of the coating composition and the adhesive composition, when the blocked isocyanate (curing agent) is a mixture of the first blocked isocyanate component and the second blocked isocyanate component, for example, first, the first blocked isocyanate component and the second blocked isocyanate component are blended to prepare the curing agent, and thereafter, the curing agent can be blended with the polyol compound (main component) at the time of use; or, for example, one of the first blocked isocyanate component and the second blocked isocyanate component is blended with the polyol compound (main component), and thereafter the other is blended.

The dissociation conditions are not particularly limited as long as the blocking agent (first blocking agent and second blocking agent) in the blocked isocyanate are dissociated, and to be specific, the dissociation temperature (that is, a curing temperature of the coating composition and the adhesive composition) is, for example, 60° C. or more, preferably 80° C. or more, and for example, less than 150° C., preferably less than 130° C.

In this manner, the blocking agent in the blocked isocyanate is dissociated, and at the same time, the regenerated isocyanate group of the blocked isocyanate is allowed to react with the hydroxyl group of the polyol compound to cure the coating composition and the adhesive composition, thereby producing a coated film composed of polyurethane resin.

At this time, the first blocking agent (including the first blocking agent blocking the isocyanate group and the first blocking agent that is dissociated) having a higher catalysis activity that activates the isocyanate group acts as a catalyst. Therefore, by using the first blocking agent, compared with the case where only the second blocking agent is used, the coating composition and the adhesive composition can be cured more efficiently.

The catalysis activity of the first blocking agent and the catalysis activity of the second blocking agent can be compared by the following method.

That is, first, the polyisocyanate compound is allowed to react with the second blocking agent to synthesize the blocked isocyanate, and the coating composition and the adhesive composition are prepared by using the produced blocked isocyanate. The curing temperature of the coating composition and the adhesive composition is named A (° C.).

Furthermore, the polyisocyanate compound is allowed to react with the first blocking agent and the second blocking agent to synthesize the blocked isocyanate, and the coating composition and the adhesive composition are prepared by using the produced blocked isocyanate. The curing temperature of the coating composition and the adhesive composition is named B (° C.).

The difference (° C.) between A (° C.) and B (° C.) in such a case is converted to a value corresponding to 1 mol of the first blocking agent (° C./mol), and the value is defined as catalyst performance of the first blocking agent.

By comparing the catalyst performance, catalysis activity of the blocking agents can be compared.

To be more specific, a blocked isocyanate is prepared, by allowing 80 mol % of methyl ethyl ketoneoxime (MEKO) as the second blocking agent and 20 mol % of the blocking agent to be compared to react with the polyisocyanate compound. Then, catalyst performance is compared between the prepared blocked isocyanates, and it is regarded that one with a larger value has better catalysis activity.

The reaction time of the regenerated isocyanate group of the blocked isocyanate and the hydroxyl group of the polyol compound under heating conditions is, for example, 1 minute or more, preferably 10 minutes or more, and for example, 60 minutes or less, preferably 30 minutes or less. When the reaction time is the above-described lower limit or more, curing reaction sufficiently progresses, and when the reaction time is the above-described upper limit or less, processing energy can be decreased.

In such a method, as necessary, to one or both of the blocked isocyanate (curing agent) and the polyol compound (main component), as necessary, for example, additives such as the following can be suitably added: a reaction solvent, a catalyst, an epoxy resin, an application stabilizer, a leveling agent, an antifoaming agent, stabilizers such as an antioxidant and an ultraviolet absorber, a thickening agent, a precipitation prevention agent, a plasticizer, a surfactant, a pigment, a filler, an organic or inorganic fine particles, and a fungicide. The amount of the additive added is determined suitably according to its purpose and use.

In the above-described coating composition and the adhesive composition, the above-described blocked isocyanate having excellent low temperature curing properties is used, and therefore low energy and low costs can be achieved. Furthermore, the above-described blocked isocyanate has a relatively long pot life even when dispersed in water, and therefore can be used as a curing agent component of one-component polyurethane resin, and therefore has excellent workability at the time of use.

The blocked isocyanate of the present invention is not limited to the above-described polyurethane resin, and for example, can be used as a curing agent of various known resin, such as polyolefin resin, polyacrylic resin, and polyester resin.

When the blocked isocyanate of the present invention is used as a curing agent, it can be used along with a known curing agent such as melamine and epoxy. In such a case, the mixing ratio of the curing agent is set suitably in accordance with the purpose and application.

The coating composition and the adhesive composition of the present invention are applied by a known coating method, for example, by spray coating, dip coating, spin coating, rotational atomization, and curtain coating, and dried, thereby forming a coated film.

Furthermore, as necessary, electrostatic application can be performed, and furthermore, baking can be performed after application. The baking method is not limited, and for example, a known method such as infrared heating, hot air heating, and high-frequency heating are used.

The coating composition and the adhesive composition can be applied on an object, which is not particularly limited, and examples thereof include inorganic matter (non-metal) such as concrete, natural stone, and glass; metals such as iron, stainless steel, aluminum, copper, brass, and titanium; steel plates (metal) such as cold rolled steel plate, zinc plated steel plate, zinc alloy plated steel plate, stainless steel plate, and tin plated steel plate; organic matter such as plastic, rubber, adhesive, and wood material; furthermore, organic-inorganic composite such as fiber reinforced plastic (FRP), concrete-polymer composite, and fiber reinforced concrete; preferably, organic-inorganic composite is used.

The above-described coated object can be subjected to surface treatment. To be specific, for example, surface treatments such as phosphate treatment, chromate treatment, composite oxide treatment can be given to steel plate (metal), and for example, a ground coating such as electropainting or floating coated film can be given. Furthermore, the plastic can be pretreated (e.g., degreasing, washing with water, primer treatment, etc.).

The above-described coating composition and the adhesive composition can be used for overall industrial products. To be specific, examples of the article produced by applying the coating composition of the present invention onto the above-described object and the article produced by allowing the above-described object to adhere to the adhesive composition of the present invention include bodies or parts of various transportation machineries such as automobiles, bicycles, trains, and airplanes; housings and parts of household appliances; packing material for food wrapping film or paper, plastic bottle, plastic cup, can, and pot; civil engineering components such as fiber treatment material, bridge components, and steel tower; industrial machineries and materials such as waterproof material sheet, tank, and pipe; architectural components such as architectural exterior; road components; and furthermore, electrical and electric equipment and furniture.

EXAMPLES

In the following, the present invention is described based on Examples and Comparative Examples, but the present invention is not limited to Examples below. "Parts" and "%" are based on mass unless otherwise specified in the following. The numeral values used in Examples below can be replaced with corresponding numeral values used in embodiments (that is, upper limit value or lower limit value).

Preparation of Blocked Isocyanate

Example 1

To a 100 mL capacity reactor equipped with a mixer, a thermometer, a condenser, and a nitrogen gas inlet tube, 307.31 g (NCO group: 1.00 mol) of TAKENATE 127N as a polyisocyanate compound, and 224.71 g of methylisobutylketone (hereinafter may be referred to as MIBK) as a solvent were added at room temperature, and mixed.

Thereafter, 64.68 g (0.95 mol) of imidazole (hereinafter may be referred to as IMZ) as a second blocking agent was added dividedly in several times so that the temperature of the reaction solution does not exceed 50° C.

Then, 5.76 g (0.05 mol) of 1,1,3,3-tetramethylguanidine (hereinafter may be referred to as TMG) as the first blocking agent was added dividedly in several times in the same manner as IMZ, and thereafter, stirred at room temperature for 3 hours.

Thereafter, it was confirmed that the isocyanate group is blocked by FT-IR spectrum measurement, thereby producing a blocked isocyanate having a solid content concentration of 50 mass %.

Examples 2 to 14, Comparative Examples 1 to 9

A blocked isocyanate was produced in the same manner as in Example 1, except that the mixing formulation shown in Table 1 was used.

TABLE 1

| | | First blocking agent | | Second blocking agent | | |
|---|---|---|---|---|---|---|
| Example No. • Comp. Ex. No. | Polyisocyanate compound | Compound name | Amount relative to NCO1 mol (mol) | Compound name | Amount relative to NCO1 mol (mol) | Solid content concentration (%) |
| Example 1 | TAKENATE127N | TMG | 0.05 | IMZ | 0.95 | 50 |
| Example 2 | TAKENATE127N | TMG | 0.10 | IMZ | 0.90 | 50 |
| Example 3 | TAKENATE127N | TMG | 0.20 | IMZ | 0.80 | 50 |
| Example 4 | TAKENATE127N | TMG | 0.50 | IMZ | 0.50 | 50 |
| Example 5 | TAKENATE170N | TMG | 0.20 | DMP | 0.80 | 70 |
| Example 6 | TAKENATE170N | TMG | 0.20 | DMPDI | 0.80 | 70 |
| Example 7 | TAKENATE170N | TMG | 0.20 | DiPA | 0.80 | 70 |
| Example 8 | TAKENATE170N | TMG | 0.20 | MEKO | 0.80 | 70 |
| Example 9 | TAKENATE160N | TMG | 0.25 | DMP | 0.80 | 70 |
| Example 10 | TAKENATE160N | TMG | 0.15 | DMP | 0.80 | 70 |
| Example 11 | TAKENATE170N | IMZ | 0.20 | MEKO | 0.80 | 70 |
| Example 12 | TAKENATE170N | TMG | 0.20 | CP | 0.80 | 70 |
| Example 13 | TAKENATE170N | TMG | 0.02 | IMZ | 0.98 | 70 |
| Example 14 | TAKENATE170N | TMG | 0.80 | IMZ | 0.20 | 70 |
| Comp. Ex. 1 | TAKENATE127N | — | — | IMZ | 1.00 | 50 |
| Comp. Ex. 2 | TAKENATE170N | — | — | TMG | 1.00 | 70 |
| Comp. Ex. 3 | TAKENATE170N | — | — | DMP | 1.00 | 70 |
| Comp. Ex. 4 | TAKENATE170N | — | — | DMPDI | 1.00 | 70 |
| Comp. Ex. 5 | TAKENATE170N | — | — | DiPA | 1.00 | 70 |
| Comp. Ex. 6 | TAKENATE170N | — | — | MEKO | 1.00 | 70 |

TABLE 1-continued

|  |  | First blocking agent | | Second blocking agent | | |
|---|---|---|---|---|---|---|
| Example No.<br>• Comp. Ex. No. | Polyisocyanate compound | Compound name | Amount relative to NCO1 mol (mol) | Compound name | Amount relative to NCO1 mol (mol) | Solid content concentration (%) |
| Comp. Ex. 7 | TAKENATE170N | — | — | MEKO<br>DMP | 0.70<br>0.30 | 70 |
| Comp. Ex. 8 | TAKENATE170N | — | — | DMP<br>MEKO | 0.70<br>0.30 | 70 |
| Comp. Ex. 9 | TAKENATE170N | — | — | CP | 1.00 | 70 |

The abbreviations in Tables are described below. The abbreviations are the same for the following Tables as well.

TAKENATE 127N: bis(isocyanatomethyl) cyclohexane trimer, isocyanate group content 13.5%, manufactured by Mitsui Chemicals, Inc.

TAKENATE 170N: hexamethylene diisocyanate trimer, isocyanate group content 20.7%, manufactured by Mitsui Chemicals, Inc.

TAKENATE 160N: trimethylolpropane adduct of hexamethylene diisocyanate (polyol-modified product), isocyanate group content 12.6%, manufactured by Mitsui Chemicals, Inc.

TMG: 1,1,3,3-tetramethylguanidine

DMP: 3,5-dimethylpyrazole

DMPDI: 2,6-dimethylpiperidine, manufactured by Tokyo Chemical Industry Co., Ltd.

DiPA: diisopropylamine, manufactured by Tokyo Chemical Industry Co., Ltd.

MEKO: methyl ethyl ketoneoxime, manufactured by Tokyo Chemical Industry Co., Ltd.

tBEA: t-butylethylamine, manufactured by Tokyo Chemical Industry Co., Ltd.

tBBzA: t-butylbenzylamine, manufactured by Tokyo Chemical Industry Co., Ltd.

IMZ: imidazole, manufactured by The Nippon Synthetic Chemical Industry Co., Ltd.

CP: ε-caprolactam, manufactured by Tokyo Chemical Industry Co., Ltd.

2HP: 2-hydroxypyridine, manufactured by Tokyo Chemical Industry Co., Ltd.

Preparation of Coating Composition

Example 15

The concentration of acrylic polyol (Q182, manufactured by Mitsui Chemicals, Inc.) solution was adjusted by adding MIBK and t-BA as solvents so that the final solid content concentration of the coating composition was 40 mass %, and t-butanol (hereinafter may be referred to as t-BA) was 5 mass %.

To the mixture, the blocked isocyanate produced in Example 1 was added so that the molar ratio of the hydroxyl group of the acrylic polyol to the latent isocyanate group of the blocked isocyanate was 1, and the mixture was stirred for 30 minutes, thereby preparing a coating composition.

The curing temperature, catalyst effects, and catalyst performance of the produced coating composition were evaluated by the methods below. The results are shown in Table 2.

Examples 16 to 18, 26 to 28, Comparative Example 10

A coating composition was prepared in the same manner as in Example 15, except that the mixing formulation shown in Table 2 was used.

Then, curing temperature, catalyst effects, and catalyst performance of the produced coating composition were evaluated by the methods below. The results are shown in Table 2.

Examples 19 to 25, Comparative Examples 11 to 18

A coating composition was prepared in the same manner as in Example 15, except that the mixing formulation shown in Table 2 was used, and the blending amount of t-BA was set to 0 mass %.

Then, curing temperature, catalyst effects, and catalyst performance of the produced coating composition were evaluated by the methods below. The results are shown in Table 2.

Evaluation (Curing Temperature)

The coating composition was applied on a polypropylene (PP) plate with an applicator so that the thickness was 250 µm, and cured for 30 minutes at a predetermined temperature, and then thereafter aged at room temperature for 24 hours. When the curing temperature became 150° C. or more, a glass substrate was used instead of the PP plate.

The obtained coating was immersed in a mixture solvent of acetone/methanol=1/1 (vol/vol) at 23° C. for 24 hours.

Thereafter, the mass of the portion that did not dissolved in the mixture solvent relative to the mass before immersed in the mixture solvent was calculated as a gel fraction, and the temperature at which the gel fraction became 60% or more was regarded as a curing temperature.

(Catalyst Effects, Catalyst Performance)

The curing temperatures were compared between the coating composition containing the blocked isocyanate prepared only using the second blocking agent and the coating composition containing the blocked isocyanate prepared using both of the first blocking agent and the second blocking agent in combination, and the difference between the curing temperatures was determined as catalyst effects (° C.). The catalyst effects relative to 1 mol of the first blocking agent was obtained as catalyst performance (° C./mol).

TABLE 2

| Example No.・Comp. Ex. No. | Blocked isocyanate | Polyisocyanate compound | First blocking agent Compound name | First blocking agent Amount relative to NCO1 mol (mol) | Second blocking agent Compound name | Second blocking agent Amount relative to NCO1 mol (mol) |
| --- | --- | --- | --- | --- | --- | --- |
| Example 15 | Example 1 | TAKENATE127N | TMG | 0.05 | IMZ | 0.95 |
| Example 16 | Example 2 | TAKENATE127N | TMG | 0.10 | IMZ | 0.90 |
| Example 17 | Example 3 | TAKENATE127N | TMG | 0.20 | IMZ | 0.80 |
| Example 18 | Example 4 | TAKENATE127N | TMG | 0.50 | IMZ | 0.50 |
| Example 19 | Example 5 | TAKENATE170N | TMG | 0.20 | DMP | 0.80 |
| Example 20 | Example 6 | TAKENATE170N | TMG | 0.20 | DMPDI | 0.80 |
| Example 21 | Example 7 | TAKENATE170N | TMG | 0.20 | DiPA | 0.80 |
| Example 22 | Example 8 | TAKENATE170N | TMG | 0.20 | MEKO | 0.80 |
| Example 23 | Example 9 | TAKENATE160N | TMG | 0.25 | DMP | 0.80 |
| Example 24 | Example 10 | TAKENATE160N | TMG | 0.15 | DMP | 0.80 |
| Example 25 | Example 11 | TAKENATE170N | IMZ | 0.20 | MEKO | 0.80 |
| Example 26 | Example 12 | TAKENATE170N | TMG | 0.20 | CP | 0.80 |
| Example 27 | Example 13 | TAKENATE170N | TMG | 0.02 | IMZ | 0.98 |
| Example 28 | Example 14 | TAKENATE170N | TMG | 0.80 | IMZ | 0.20 |
| Comp. Ex. 10 | Comp. Ex. 1 | TAKENATE127N | — | — | IMZ | 1.00 |
| Comp. Ex. 11 | Comp. Ex. 2 | TAKENATE170N | — | — | TMG | 1.00 |
| Comp. Ex. 12 | Comp. Ex. 3 | TAKENATE170N | — | — | DMP | 1.00 |
| Comp. Ex. 13 | Comp. Ex. 4 | TAKENATE170N | — | — | DMPDI | 1.00 |
| Comp. Ex. 14 | Comp. Ex. 5 | TAKENATE170N | — | — | DiPA | 1.00 |
| Comp. Ex. 15 | Comp. Ex. 6 | TAKENATE170N | — | — | MEKO | 1.00 |
| Comp. Ex. 16 | Comp. Ex. 7 | TAKENATE170N | — | — | MEKO | 0.70 |
|  |  |  | — | — | DMP | 0.30 |
| Comp. Ex. 17 | Comp. Ex. 8 | TAKENATE170N | — | — | DMP | 0.70 |
|  |  |  | — | — | MEKO | 0.30 |
| Comp. Ex. 18 | Comp. Ex. 9 | TAKENATE170N | — | — | CP | 1.00 |

| Example No.・Comp. Ex. No. | Solid content concentration (%) | Curing temperature (° C.) | Catalyst effects (° C.) | Catalyst performance (° C./mol) |
| --- | --- | --- | --- | --- |
| Example 15 | 40 | 90 | 20 | 400 |
| Example 16 | 40 | 90 | 20 | 200 |
| Example 17 | 40 | 80 | 30 | 150 |
| Example 18 | 40 | 80 | 20 | 40 |
| Example 19 | 45 | 100 | 30 | 150 |
| Example 20 | 45 | 110 | 30 | 150 |
| Example 21 | 45 | 110 | 30 | 150 |
| Example 22 | 45 | 120 | 20 | 100 |
| Example 23 | 45 | 100 | 30 | 120 |
| Example 24 | 45 | 100 | 30 | 200 |
| Example 25 | 45 | 130 | 10 | 50 |
| Example 26 | 45 | 160 | 10 | 50 |
| Example 27 | 40 | 100 | 10 | 500 |
| Example 28 | 40 | 90 | 20 | 25 |
| Comp. Ex. 10 | 40 | 110 | — | — |
| Comp. Ex. 11 | 45 | 110 | — | — |
| Comp. Ex. 12 | 45 | 130 | — | — |
| Comp. Ex. 13 | 45 | 140 | — | — |
| Comp. Ex. 14 | 45 | 140 | — | — |
| Comp. Ex. 15 | 45 | 140 | — | — |
| Comp. Ex. 16 | 45 | 140 | 0 | 0 |
| Comp. Ex. 17 | 45 | 130 | 0 | 0 |
| Comp. Ex. 18 | 45 | 170 | — | — |

Coating Composition with Blocked Isocyanate Mixed

Example 29

Two types of blocked isocyanates were synthesized in the same manner as in Example 1, except that the mixing formulation shown in Table 3 was used. Thereafter, the blocked isocyanates were mixed so that the latent isocyanate group ratio achieved the composition shown in Table 3.

Thereafter, the produced mixed blocked isocyanate was added to an acrylic polyol (Q182, manufactured by Mitsui Chemicals, Inc.) solution having a concentration adjusted so that the final solid content concentration of the coating composition was 40 mass %, and t-butanol (t-BA) was 5 mass % by adding MIBK and t-BA as a solvent, such that the molar ratio of the hydroxyl group of acrylic polyol to the latent isocyanate group of the mixed blocked isocyanate was 1, and the mixture was stirred for 30 minutes, thereby producing a coating composition.

Then, the curing temperature, catalyst effects, and catalyst performance of the produced coating composition were evaluated by the above-described method. The results are shown in Table 3.

Example 30

A coating composition was prepared in the same manner as in Example 29, except that the mixing formulation shown in Table 3 was used. The curing temperature, catalyst effects, and catalyst performance of the produced coating composition was evaluated by the above-described method. The results are shown in Table 3.

forming reaction at 90° C. until no change occurs in remaining isocyanate amount, thereby synthesizing a hydrophilic group-containing polyisocyanate. The isocyanate group content (NCO (%)) and the ethylene oxide group-content (EO (%)) of the produced hydrophilic group-containing polyisocyanate are shown in Table 4.

The remaining isocyanate amount during reaction was determined by back titration using dibutylamine. The produced isocyanate group of the hydrophilic group-containing polyisocyanate content was determined by back titration using dibutylamine, and Table 4 shows values based on resin excluding solvent. The ethylene oxide group-content was determined by calculation based on charged ratio.

TABLE 3

| | Blocked isocyanate(1) | | | | Blocked isocyanate(2) | | | |
|---|---|---|---|---|---|---|---|---|
| Example No. • Comp. Ex. No. | Polyisocyanate compound | Blocking agent Compound name | Amount relative to NCO1 mol (mol) | Solid content concentration (%) | Polyisocyanate compound | Blocking agent Compound name | Amount relative to NCO1 mol (mol) | Solid content concentration (%) |
| Example 29 | TAKENATE 127N | TMG | 1.00 | 70 | TAKENATE 127N | IMZ | 1.00 | 70 |
| Example 30 | TAKENATE 170N | TMG | 1.00 | 70 | TAKENATE 170N | DMP | 1.00 | 70 |

| Example No. • Comp. Ex. No. | Mixing ratio (1):(2) | Solid content concentration (%) | Curing temperature (° C.) | Catalyst effects (° C.) | Catalyst performance (° C./mol) |
|---|---|---|---|---|---|
| Example 29 | 2:8 | 40 | 80 | 30 | 30 |
| Example 30 | 2:8 | 45 | 100 | 30 | 30 |

Synthesis of Polyoxyethylene Side Chain-Containing Diol

Synthesis Example 1

A four-neck flask equipped with a mixer, a thermometer, a reflux tube, and a nitrogen inlet tube was charged with 1000 g of methoxy PEG#1000 (number average molecular weight 1000: manufactured by TOHO Chemical Industry Co., Ltd.) and 1682 g of 1,6-hexamethylene diisocyanate (manufactured by Mitsui Chemicals, Inc.), and the charged mixture was allowed to react in a nitrogen atmosphere at 90° C. for 9 hours. The produced reaction solution was subjected to thin film evaporation to remove unreacted 1,6-hexamethylene diisocyanate, thereby producing polyoxyethylene group-containing monoisocyanate Then, a four-neck flask equipped with a mixer, a thermometer, a reflux tube, and a nitrogen inlet tube was charged with 82.5 g of diethanolamine, and 917.5 g of the above-described polyoxyethylene group-containing monoisocyanate (I) was gradually dropped therein in a nitrogen atmosphere while cooling by air-cooling so that the reaction temperature does not exceed 70° C. After the dropping was completed, the mixture was stirred for about 1 hour in a nitrogen atmosphere at 70° C., disappearance of the isocyanate group was confirmed, thereby producing polyoxyethylene side chain-containing diol (II).

Synthesis of Hydrophilic Group-Containing Polyisocyanate

Synthesis Example 2

A 1 L capacity reactor equipped with a mixer, a thermometer, a condenser, and a nitrogen gas inlet tube was charged with 500.00 g (NCO: 2.504 mol) of TAKENATE 170N (hexamethylene diisocyanate trimer, isocyanate group content 20.7%, manufactured by Mitsui Chemicals, Inc.) and 157.89 g of methoxy PEG#550 (number average molecular weight 550: manufactured by TOHO Chemical Industry Co., Ltd., OH: 0.280 mol) as the hydrophilic compound containing an active hydrogen group (equivalent ratio (OH/NCO)=0.112), and the charged mixture was subjected to urethane-

Synthesis Examples 3 to 9

A hydrophilic group-containing polyisocyanate was synthesized in the same manner as in Synthesis Example 2 except that the conditions for the material components were changed to the conditions shown in Table 4. The isocyanate group content and the ethylene oxide group-content (EO (%)) of the produced hydrophilic group-containing polyisocyanate are shown in Table 4.

TABLE 4

| Synthesis Ex. No. | Polyisocyanate compound | Hydrophilic compound having active hydrogen group | Equivalent ratio (OH/NCO) | NCO (%) | EO (%) |
|---|---|---|---|---|---|
| Synthesis Ex. 2 | TAKENATE 127N | POE side chain-containing diol | 0.134 | 10.2 | 22.0 |
| Synthesis Ex. 3 | TAKENATE 170N | methoxy PEG#550 | 0.112 | 14.1 | 24.0 |
| Synthesis Ex. 4 | TAKENATE 170N | methoxy PEG#1000 | 0.050 | 15.7 | 20.0 |
| Synthesis Ex. 5 | TAKENATE 170N | methoxy PEG#400 | 0.056 | 17.7 | 10.0 |
| Synthesis Ex. 6 | TAKENATE 170N | methoxy PEG#400 | 0.089 | 15.8 | 15.0 |
| Synthesis Ex. 7 | TAKENATE 170N | methoxy PEG#400 | 0.216 | 11.0 | 30.0 |
| Synthesis Ex. 8 | TAKENATE 170N | methoxy PEG#400 | 0.424 | 6.4 | 46.0 |
| Synthesis Ex. 9 | TAKENATE 170N | methoxy PEG#1000 | 0.010 | 19.5 | 5.0 |

Details of the abbreviation in Tables are shown below. The abbreviations are the same in the following Tables as well.
TAKENATE 170N: hexamethylene diisocyanate trimer, isocyanate group content 20.7%, manufactured by Mitsui Chemicals, Inc.
TAKENATE 127N: bis(isocyanatomethyl) cyclohexane trimer, isocyanate group content 13.5%, manufactured by Mitsui Chemicals, Inc.
POE side chain diol: polyoxyethylene side chain-containing diol (II) produced in Synthesis Example 1
Methoxy PEG#550: poly (oxyethylene) methylether, number average molecular weight 550, manufactured by TOHO Chemical Industry Co., Ltd.
Methoxy PEG#400: poly (oxyethylene) methylether, number average molecular weight 400, manufactured by TOHO Chemical Industry Co., Ltd.
Methoxy PEG#1000: poly (oxyethylene) methylether, number average molecular weight 1000, manufactured by TOHO Chemical Industry Co., Ltd.

Preparation of Water-Dispersed Blocked Isocyanate

Example 31

A 200 mL capacity reactor equipped with a mixer, a thermometer, a condenser, and a nitrogen gas inlet tube was charged with 50.616 g (NCO group: 0.100 mol) of hydrophilic group-containing polyisocyanate of Synthesis Example 3 and 26.787 g of MIBK as a solvent, and the charged materials were mixed well at room temperature.

Thereafter, 6.468 g (0.095 mol) of imidazole (IMZ) as a second blocking agent was added in portions several times so that the solution temperature did not exceed 50° C.

Then, 0.576 g (0.005 mol) of 1,1,3,3-tetramethylguanidine (TMG) as the first blocking agent was added in portions several times in the same manner as IMZ, and thereafter the mixture was stirred at room temperature for 3 hours.

Thereafter, it was confirmed that the isocyanate was blocked by FT-IR measurement, thereby producing a blocked isocyanate having a solid content concentration of 60 mass %.

Water dispersiveness of the produced blocked isocyanate and pot life of the isocyanate in water were evaluated by the following method. The results are shown in Table 5.

Examples 32 to 53 and Comparative Examples 19 to 29

The blocked isocyanate was produced in the same manner as in Example 31, except that the mixing formulation shown in Table 5 and Table 6 was used.

TABLE 5

| Example No. · Comp. Ex. No. | Hydrophilic compound-group containing Polyisocyanate | | | First blocking agent | | Second blocking agent | | Solid content concentration (%) |
|---|---|---|---|---|---|---|---|---|
| | Synthesis Ex. No. | Hydrophilic compound having active hydrogen group | EO (%) | Compound name | Amount relative to 1 mol of NCO (mol) | Compound name | Amount relative to 1 mol of NCO (mol) | |
| Ex. 31 | Synthesis Ex. 2 | POE side chain-containing diol | 22.0 | TMG | 0.05 | IMZ | 0.95 | 60 |
| Ex. 32 | Synthesis Ex. 2 | POE side chain-containing diol | 22.0 | TMG | 0.10 | IMZ | 0.90 | 60 |
| Ex. 33 | Synthesis Ex. 2 | POE side chain-containing diol | 22.0 | TMG | 0.20 | IMZ | 0.80 | 60 |
| Ex. 34 | Synthesis Ex. 2 | POE side chain-containing diol | 22.0 | TMG | 0.50 | IMZ | 0.50 | 60 |
| Ex. 35 | Synthesis Ex. 3 | methoxy PEG#550 | 24.0 | TMG | 0.20 | DMP | 0.80 | 70 |
| Ex. 36 | Synthesis Ex. 3 | methoxy PEG#550 | 24.0 | TMG | 0.20 | DMPDI | 0.80 | 70 |
| Ex. 37 | Synthesis Ex. 3 | methoxy PEG#550 | 24.0 | TMG | 0.20 | DiPA | 0.80 | 70 |
| Ex. 38 | Synthesis Ex. 3 | methoxy PEG#550 | 24.0 | TMG | 0.20 | MEKO | 0.80 | 70 |
| Ex. 39 | Synthesis Ex. 3 | methoxy PEG#550 | 24.0 | TMG | 0.25 | DMP | 0.80 | 70 |
| Ex. 40 | Synthesis Ex. 3 | methoxy PEG#550 | 24.0 | TMG | 0.15 | DMP | 0.80 | 70 |
| Ex. 41 | Synthesis Ex. 3 | methoxy PEG#550 | 24.0 | TMG | 0.20 | DMP | 0.80 | 70 |
| Ex. 42 | Synthesis Ex. 3 | methoxy PEG#550 | 24.0 | IMZ | 0.20 | MEKO | 0.80 | 70 |
| Ex. 43 | Synthesis Ex. 4 | methoxy PEG#1000 | 20.0 | TMG | 0.20 | DMP | 0.80 | 70 |
| Ex. 44 | Synthesis Ex. 5 | methoxy PEG#400 | 10.0 | TMG | 0.20 | DMP | 0.80 | 70 |
| Ex. 45 | Synthesis Ex. 6 | methoxy PEG#400 | 15.0 | TMG | 0.20 | DMP | 0.80 | 70 |
| Ex. 46 | Synthesis Ex. 7 | methoxy PEG#400 | 30.0 | TMG | 0.20 | DMP | 0.80 | 70 |
| Ex. 47 | Synthesis Ex. 8 | methoxy PEG#400 | 46.0 | TMG | 0.20 | DMP | 0.80 | 70 |
| Ex. 48 | Synthesis Ex. 9 | methoxy PEG#1000 | 5.0 | TMG | 0.20 | DMP | 0.80 | 70 |
| Ex. 49 | Synthesis Ex. 3 | methoxy PEG#550 | 24.0 | TMG | 0.20 | CP | 0.80 | 70 |

TABLE 5-continued

| Example No. • Comp. Ex. No. | Hydrophilic compound-group containing Polyisocyanate | | | First blocking agent | | Second blocking agent | | Solid content concentration (%) |
|---|---|---|---|---|---|---|---|---|
| | Synthesis Ex. No. | Hydrophilic compound having active hydrogen group | EO (%) | Compound name | Amount relative to 1 mol of NCO (mol) | Compound name | Amount relative to 1 mol of NCO (mol) | |
| Ex. 50 | Synthesis Ex. 2 | POE side chain-containing diol | 24.0 | TMG | 0.02 | IMZ | 0.98 | 50 |
| Ex. 51 | Synthesis Ex. 2 | POE side chain-containing diol | 24.0 | TMG | 0.80 | IMZ | 0.20 | 50 |
| Ex. 52 | Synthesis Ex. 3 | methoxy PEG#550 | 24.0 | TMG | 0.20 | tBEA | 0.80 | 70 |
| Ex. 53 | Synthesis Ex. 3 | methoxy PEG#550 | 24.0 | TMG | 0.20 | tBBzA | 0.80 | 70 |

TABLE 6

| Example No. • Comp. Ex. No. | Hydrophilic compound-group containing Polyisocyanate | | | First blocking agent | | Second blocking agent | | Solid content concentration (%) |
|---|---|---|---|---|---|---|---|---|
| | Synthesis Ex. No. | Hydrophilic compound having active hydrogen group | EO (%) | Compound name | Amount relative to 1 mol of NCO (mol) | Compound name | Amount relative to 1 mol of NCO (mol) | |
| Comp. Ex. 19 | Synthesis Ex. 2 | POE side chain-containing diol | 24.0 | — | — | IMZ | 1.00 | 50 |
| Comp. Ex. 20 | Synthesis Ex. 3 | methoxy PEG#550 | 24.0 | — | — | TMG | 1.00 | 70 |
| Comp. Ex. 21 | Synthesis Ex. 3 | methoxy PEG#550 | 24.0 | — | — | DMP | 1.00 | 70 |
| Comp. Ex. 22 | Synthesis Ex. 3 | methoxy PEG#550 | 24.0 | — | — | DMPDI | 1.00 | 70 |
| Comp. Ex. 23 | Synthesis Ex. 3 | methoxy PEG#550 | 24.0 | — | — | DiPA | 1.00 | 70 |
| Comp. Ex. 24 | Synthesis Ex. 3 | methoxy PEG#550 | 24.0 | — | — | MEKO | 1.00 | 70 |
| Comp. Ex. 25 | Synthesis Ex. 3 | methoxy PEG#550 | 24.0 | — | — | MEKO DMP | 0.70 0.30 | 70 |
| Comp. Ex. 26 | Synthesis Ex. 3 | methoxy PEG#550 | 24.0 | — | — | CP | 1.00 | 70 |
| Comp. Ex. 27 | Synthesis Ex. 3 | methoxy PEG#550 | 24.0 | — | — | 2HP | 1.00 | 70 |
| Comp. Ex. 28 | Synthesis Ex. 3 | methoxy PEG#550 | 24.0 | — | — | tBEA | 1.00 | 70 |
| Comp. Ex. 29 | Synthesis Ex. 3 | methoxy PEG#550 | 24.0 | — | — | tBBzA | 1.00 | 70 |

Preparation of Coating Composition

Example 54

The blocked isocyanate produced in Example 31 was added to an aqueous dispersion of acrylic polyol (trade name RE4788, manufactured by Mitsui Chemicals, Inc.) to which water was added to adjust the concentration to have the final solid content concentration of the coating composition was 30 mass %, so that the molar ratio of the hydroxyl group of acrylic polyol to the latent isocyanate group of the blocked isocyanate was 1 and the mixture was stirred for 30 minutes, thereby preparing a coating composition.

The curing temperature and pot life of the produced coating composition were evaluated by the following method. The results are shown in Table 7.

Examples 55 to 76 and Comparative Examples 30 to 40

A coating composition was prepared in the same manner as in Example 54, except that the mixing formulation shown in Table 7 and Table 8 was used.

The curing temperature and pot life of the produced coating composition were evaluated by the following method. The results are shown in Tables 7 and 8.

Comparative Example 41

To 100 mol of the latent isocyanate group of the coating composition of Comparative Example 32, 20 mol of 1,1,3,3-tetramethylguanidine (TMG) was added, thereby preparing a coating composition. Separation and coagulation occurred in the coating composition after 24 hours.

Evaluation (Curing Temperature)

The coating composition immediately after preparation was applied on a polypropylene (PP) plate having a thickness of 250 μm with an applicator, and the coating was cured for 30 minutes at a predetermined temperature. The coating was immersed in a mixture solvent of acetone/methanol=1/1 (vol/vol) at 23° C. for 24 hours.

Thereafter, the mass of the portion that did not dissolved in the mixture solvent relative to the mass thereof before immersed in the mixture solvent was calculated as a gel fraction, and the temperature at which the gel fraction became 80% or more was regarded as a curing temperature.

When the curing temperature is 150° C. or more, a glass substrate was used instead of the PP plate.

(Catalyst Effects, Catalyst Performance)

The curing temperatures were compared between the coating composition containing the blocked isocyanate prepared only using the second blocking agent and the coating composition containing the blocked isocyanate prepared using both of the first blocking agent and the second blocking agent in combination, and the difference in the curing temperature is obtained as catalyst effects (° C.). The catalyst effects relative to 1 mol of the first blocking agent are obtained as catalyst performance (° C./mol).

(Pot Life)

After the preparation of the coating composition, when the curing temperature of the coating composition was 90° C. or less, the coating composition was stored at 23° C., and when the coating composition was 100° C. or more, the coating composition was stored at 40° C. After the storage for 7 days, the coating composition was applied on a silicon wafer, and dried for 1 hour, and then IR spectrum measurement was performed. The IR spectrum measurement was performed after curing also at 150° C. for 30 minutes, and the NCO amount that reacted with OH of the main component was calculated based on the changes in the peak intensity of the OH peak (3520 cm$^{-1}$) of the main component, and when the calculated NCO amount was 60% or more, the pot life was evaluated as excellent, when the calculated NCO amount was 50% or more and less than 60%, the pot life was evaluated as good, when the calculated NCO amount was 30% or more and less than 50% or when a small amount of precipitation was observed, the pot life was evaluated as not so good, and when the calculated NCO amount was less than 30%, the pot life was evaluated as bad.

(Mechanical Property of the Coating)

The prepared coating composition was applied on a PP plate to give a thickness of 250 µm with an applicator, cured at a predetermined temperature shown in Table 9 for 20 minutes, and thereafter aged at room temperature for 24 hours. Thereafter, the coating was peeled off from the PP plate, and tensile test was performed. The test results obtained are shown in Table 9.

(Evaluation of Water Resistance of Coating)

The prepared coating composition was applied on an acrylonitrile-butadiene-styrene copolymer (ABS) substrate with #5 bar coater, and cured at 120° C. for 30 minutes. Then, the cured coating was immersed in water at 40° C. for 7 days, and then thereafter glossiness was measured with a gloss meter VG2000 (manufactured by Nippon Denshoku Industries Co., Ltd.). The measured glossiness of 90 or more was evaluated as excellent, 85 or more was evaluated as good, and less than 85 was evaluated as bad.

(Solvent Resistance of Coating)

The prepared coating composition was applied on a tin substrate with a 100 µm applicator, and cured at 120° C. for 30 minutes. Then, the cured coating was rubbed with a piece of gauze immersed in ethyl acetate for 50 times, and the coating was observed. Those coatings with no damage were evaluated as excellent, and those coatings with damage were evaluated as bad.

TABLE 7

| | | Hydrophilic compound-group containing Polyisocyanate | | | First blocking agent | |
|---|---|---|---|---|---|---|
| Example No. • Comp. Ex. No. | Blocked isocyanate Example No. | Synthesis Ex. No. | Hydrophilic compound having active hydrogen group | EO(%) | Compound name | Amount relative to NCO1 mol (mol) |
| Example 54 | Example 31 | Synthesis Ex. 2 | POE side chain-containing diol | 20.0 | TMG | 0.05 |
| Example 55 | Example 32 | Synthesis Ex. 2 | POE side chain-containing diol | 20.0 | TMG | 0.10 |
| Example 56 | Example 33 | Synthesis Ex. 2 | POE side chain-containing diol | 20.0 | TMG | 0.20 |
| Example 57 | Example 34 | Synthesis Ex. 2 | POE side chain-containing diol | 20.0 | TMG | 0.50 |
| Example 58 | Example 35 | Synthesis Ex. 3 | methoxy PEG#550 | 24.0 | TMG | 0.20 |
| Example 59 | Example 36 | Synthesis Ex. 3 | methoxy PEG#550 | 24.0 | TMG | 0.20 |
| Example 60 | Example 37 | Synthesis Ex. 3 | methoxy PEG#550 | 24.0 | TMG | 0.20 |
| Example 61 | Example 38 | Synthesis Ex. 3 | methoxy PEG#550 | 24.0 | TMG | 0.20 |
| Example 62 | Example 39 | Synthesis Ex. 3 | methoxy PEG#550 | 24.0 | TMG | 0.25 |
| Example 63 | Example 40 | Synthesis Ex. 3 | methoxy PEG#550 | 24.0 | TMG | 0.15 |
| Example 64 | Example 41 | Synthesis Ex. 3 | methoxy PEG#550 | 24.0 | TMG | 0.20 |
| Example 65 | Example 42 | Synthesis Ex. 3 | methoxy PEG#550 | 24.0 | IMZ | 0.20 |
| Example 66 | Example 43 | Synthesis Ex. 4 | methoxy PEG#1000 | 20.0 | TMG | 0.20 |
| Example 67 | Example 44 | Synthesis Ex. 5 | methoxy PEG#400 | 10.0 | TMG | 0.20 |
| Example 68 | Example 45 | Synthesis Ex. 6 | methoxy PEG#400 | 15.0 | TMG | 0.20 |
| Example 69 | Example 46 | Synthesis Ex. 7 | methoxy PEG#400 | 30.0 | TMG | 0.20 |

TABLE 7-continued

| Example No. | | | | | | |
|---|---|---|---|---|---|---|
| Example 70 | Example 47 | Synthesis Ex. 8 | methoxy PEG#400 | 46.0 | TMG | 0.20 |
| Example 71 | Example 48 | Synthesis Ex. 9 | methoxy PEG#1000 | 5.0 | TMG | 0.20 |
| Example 72 | Example 49 | Synthesis Ex. 3 | methoxy PEG#550 | 24.0 | TMG | 0.20 |
| Example 73 | Example 50 | Synthesis Ex. 2 | POE side chain-containing diol | 24.0 | TMG | 0.02 |
| Example 74 | Example 51 | Synthesis Ex. 2 | POE side chain-containing diol | 24.0 | TMG | 0.80 |
| Example 75 | Example 52 | Synthesis Ex. 3 | methoxy PEG#550 | 24.0 | TMG | 0.20 |
| Example 76 | Example 53 | Synthesis Ex. 3 | methoxy PEG#550 | 24.0 | TMG | 0.20 |

| Example No. • Comp. Ex. No. | Second blocking agent | | Pot life | Curing temperature (° C.) | Catalyst effects (° C.) | Catalyst performance (° C./mol) |
|---|---|---|---|---|---|---|
| | Compound name | Amount relative to NCO1 mol (mol) | | | | |
| Example 54 | IMZ | 0.95 | Excellent | 90 | 20 | 400 |
| Example 55 | IMZ | 0.90 | Excellent | 90 | 20 | 200 |
| Example 56 | IMZ | 0.80 | Good | 80 | 30 | 150 |
| Example 57 | IMZ | 0.50 | Good | 80 | 30 | 60 |
| Example 58 | DMP | 0.80 | Excellent | 100 | 30 | 150 |
| Example 59 | DMPDI | 0.80 | Excellent | 110 | 30 | 150 |
| Example 60 | DiPA | 0.80 | Excellent | 110 | 30 | 150 |
| Example 61 | MEKO | 0.80 | Excellent | 120 | 20 | 100 |
| Example 62 | DMP | 0.80 | Excellent | 100 | 30 | 120 |
| Example 63 | DMP | 0.80 | Excellent | 100 | 30 | 200 |
| Example 64 | DMP | 0.80 | Excellent | 100 | 30 | 150 |
| Example 65 | MEKO | 0.80 | Excellent | 130 | 10 | 50 |
| Example 66 | DMP | 0.80 | Excellent | 100 | 30 | 150 |
| Example 67 | DMP | 0.80 | Good | 100 | 30 | 150 |
| Example 68 | DMP | 0.80 | Excellent | 100 | 30 | 150 |
| Example 69 | DMP | 0.80 | Good | 100 | 30 | 150 |
| Example 70 | DMP | 0.80 | Not so good | 100 | 30 | 150 |
| Example 71 | DMP | 0.80 | Not so good | 100 | 30 | 150 |
| Example 72 | CP | 0.80 | Excellent | 160 | 10 | 50 |
| Example 73 | IMZ | 0.98 | Excellent | 100 | 10 | 500 |
| Example 74 | IMZ | 0.20 | Not so good | 90 | 20 | 25 |
| Example 75 | tBEA | 0.80 | Excellent | 100 | 30 | 150 |
| Example 76 | tBBzA | 0.80 | Excellent | 100 | 30 | 150 |

TABLE 8

| Example No. • Comp. Ex. No. | Blocked isocyanate Example No. | Hydrophilic compound-group containing Polyisocyanate | | | First blocking agent | |
|---|---|---|---|---|---|---|
| | | Synthesis Ex. No. | Hydrophilic compound having active hydrogen group | EO (%) | Compound name | Amount relative to NCO1 mol (mol) |
| Comp. Ex. 30 | Comp. Ex. 19 | Synthesis Ex. 2 | POE side chain-containing diol | 24.0 | — | — |
| Comp. Ex. 31 | Comp. Ex. 20 | Synthesis Ex. 3 | methoxy PEG#550 | 24.0 | — | — |
| Comp. Ex. 32 | Comp. Ex. 21 | Synthesis Ex. 3 | methoxy PEG#550 | 24.0 | — | — |
| Comp. Ex. 33 | Comp. Ex. 22 | Synthesis Ex. 3 | methoxy PEG#550 | 24.0 | — | — |
| Comp. Ex. 34 | Comp. Ex. 23 | Synthesis Ex. 3 | methoxy PEG#550 | 24.0 | — | — |
| Comp. Ex. 35 | Comp. Ex. 24 | Synthesis Ex. 3 | methoxy PEG#550 | 24.0 | — | — |
| Comp. Ex. 36 | Comp. Ex. 25 | Synthesis Ex. 3 | methoxy PEG#550 | 24.0 | — | — |
| Comp. Ex. 37 | Comp. Ex. 26 | Synthesis Ex. 3 | methoxy PEG#550 | 24.0 | — | — |
| Comp. Ex. 38 | Comp. Ex. 27 | Synthesis Ex. 3 | methoxy PEG#550 | 24.0 | — | — |

TABLE 8-continued

| | | | | | | | |
|---|---|---|---|---|---|---|---|
| Comp. Ex. 39 | Comp. Ex. 28 | Synthesis Ex. 3 | methoxy PEG#550 | 24.0 | — | — | |
| Comp. Ex. 40 | Comp. Ex. 29 | Synthesis Ex. 3 | methoxy PEG#550 | 24.0 | — | — | |

| Example No. • Comp. Ex. No. | Second blocking agent Compound name | Amount relative to NCO1 mol (mol) | Pot life | Curing temperature (° C.) | Catalyst effects (° C.) | Catalyst performance (° C./mol) |
|---|---|---|---|---|---|---|
| Comp. Ex. 30 | IMZ | 1.00 | Bad | 110 | — | — |
| Comp. Ex. 31 | TMG | 1.00 | — | 120 | — | — |
| Comp. Ex. 32 | DMP | 1.00 | Excellent | 130 | — | — |
| Comp. Ex. 33 | DMPDI | 1.00 | Excellent | 140 | — | — |
| Comp. Ex. 34 | DiPA | 1.00 | Excellent | 140 | — | — |
| Comp. Ex. 35 | MEKO | 1.00 | Excellent | 140 | — | — |
| Comp. Ex. 36 | MEKO DMP | 0.70 0.30 | Excellent | 140 | 0 | 0 |
| Comp. Ex. 37 | CP | 1.00 | Excellent | 170 | — | — |
| Comp. Ex. 38 | 2HP | 1.00 | Bad | 90 | — | — |
| Comp. Ex. 39 | tBEA | 1.00 | Excellent | 140 | — | — |
| Comp. Ex. 40 | tBBzA | 1.00 | Excellent | 140 | — | — |

TABLE 9

| Example No. • Comp. Ex. No. | Blocked isocyanate Example No. | Hydrophilic compound-group containing Polyisocyanate Synthesis Ex. No. | Hydrophilic compound having active hydrogen group | EO (%) | First blocking agent Compound name | Amount relative to NCO1 mol (mol) | Second blocking agent Compound name | Amount relative to NCO1 mol (mol) |
|---|---|---|---|---|---|---|---|---|
| Example 58 | Example 35 | Synthesis Ex. 3 | methoxy PEG#550 | 24.0 | TMG | 0.20 | DMP | 0.80 |
| Example 59 | Example 36 | Synthesis Ex. 3 | methoxy PEG#550 | 24.0 | TMG | 0.20 | DMPDI | 0.80 |
| Example 60 | Example 37 | Synthesis Ex. 3 | methoxy PEG#550 | 24.0 | TMG | 0.20 | DiPA | 0.80 |
| Example 62 | Example 39 | Synthesis Ex. 3 | methoxy PEG#550 | 24.0 | TMG | 0.25 | DMP | 0.80 |
| Example 63 | Example 40 | Synthesis Ex. 3 | methoxy PEG#550 | 24.0 | TMG | 0.15 | DMP | 0.80 |
| Example 64 | Example 41 | Synthesis Ex. 3 | methoxy PEG#550 | 24.0 | TMG | 0.20 | DMP | 0.80 |
| Example 75 | Example 52 | Synthesis Ex. 3 | methoxy PEG#550 | 24.0 | TMG | 0.20 | tBEA | 0.80 |
| Example 76 | Example 53 | Synthesis Ex. 3 | methoxy PEG#550 | 24.0 | TMG | 0.20 | tBBzA | 0.80 |
| Comp. Ex. 31 | Comp. Ex. 20 | Synthesis Ex. 3 | methoxy PEG#550 | 24.0 | — | — | TMG | 1.00 |
| Comp. Ex. 32 | Comp. Ex. 21 | Synthesis Ex. 3 | methoxy PEG#550 | 24.0 | — | — | DMP | 1.00 |
| Comp. Ex. 33 | Comp. Ex. 22 | Synthesis Ex. 3 | methoxy PEG#550 | 24.0 | — | — | DMPDI | 1.00 |
| Comp. Ex. 34 | Comp. Ex. 23 | Synthesis Ex. 3 | methoxy PEG#550 | 24.0 | — | — | DiPA | 1.00 |
| Comp. Ex. 39 | Comp. Ex. 28 | Synthesis Ex. 3 | methoxy PEG#550 | 24.0 | — | — | tBEA | 1.00 |
| Comp. Ex. 40 | Comp. Ex. 29 | Synthesis Ex. 3 | methoxy PEG#550 | 24.0 | — | — | tBBzA | 1.00 |

| Example No. • Comp. Ex. No. | Coated film forming temperature 90° C. Tensile strength (MPa) | Coated film forming temperature 90° C. Elongation (%) | Coated film forming temperature 120° C. Tensile strength (MPa) | Coated film forming temperature 120° C. Elongation (%) | Water resistance of coated film | Solvent resistance of coated film |
|---|---|---|---|---|---|---|
| Example 58 | 10.1 | 150 | 45.6 | 5 | Excellent | Excellent |
| Example 59 | 9.8 | 180 | 40.8 | 6 | Good | Excellent |
| Example 60 | 10.8 | 200 | 38.9 | 8 | Good | Excellent |
| Example 62 | 9.7 | 170 | 40.7 | 5 | Good | Excellent |
| Example 63 | 9.5 | 250 | 40.8 | 6 | Excellent | Excellent |
| Example 64 | 11.5 | 180 | 38.9 | 8 | Excellent | Excellent |
| Example 75 | 10.5 | 220 | 38.5 | 7 | Excellent | Excellent |

TABLE 9-continued

|  |  |  |  |  |  |  |
|---|---|---|---|---|---|---|
| Example 76 | 10.8 | 200 | 40.1 | 6 | Excellent | Excellent |
| Comp. Ex. 31 | *1 | *1 | *1 | *1 | Bad | Bad |
| Comp. Ex. 32 | *1 | *1 | 7.8 | 250 | Bad | Bad |
| Comp. Ex. 33 | *1 | *1 | 8.7 | 200 | Bad | Bad |
| Comp. Ex. 34 | *1 | *1 | 6.7 | 250 | Bad | Bad |
| Comp. Ex. 39 | *1 | *1 | 10.8 | 200 | Bad | Bad |
| Comp. Ex. 40 | *1 | *1 | 11.2 | 160 | Bad | Bad |

*1: Coated film was soft and could not be evaluated

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The blocked isocyanate of the present invention, the coating composition of the present invention, and the adhesive composition, and the article in which these compositions are used can be suitably used in overall industrial products of various industrial fields.

The invention claimed is:

1. A blocked isocyanate comprising a latent isocyanate group, which is an isocyanate group blocked with a blocking agent,
wherein the blocked isocyanate comprises a first latent isocyanate group that is an isocyanate group blocked with a first blocking agent and a second latent isocyanate group that is an isocyanate group blocked with a second blocking agent,
the first latent isocyanate group and the second latent isocyanate group are both present in one molecule, or are present separately in different molecules in which only the first latent isocyanate group is present in one molecule and only the second latent isocyanate group is present in another molecule,
the first blocking agent is represented by general formula (1) below,
a dissociation temperature at which the first blocking agent and the second blocking agent in the blocked isocyanate comprising the first latent isocyanate group and the second latent isocyanate group are dissociated is lower than a dissociation temperature at which the second blocking agent in a blocked isocyanate comprising only the second latent isocyanate group and not comprising the first latent isocyanate group is dissociated, and
1 mol % or more and 30 mol % or less of the first latent isocyanate group is contained relative to a total mol of the first latent isocyanate group and the second latent isocyanate group:

[Chem. 1]

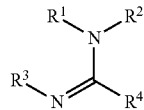

(1)

(where R1 to R3 represent a hydrocarbon group having 1 to 12 carbon atoms or a hydrogen atom, and at least one of R1 to R3 represents a hydrogen atom, and R1 and R3 are optionally bonded to each other to form a heterocycle; R4 represents an atomic group represented by —NR⁵R⁶ (R5 and R6 represent a hydrocarbon group having 1 to 12 carbon atoms, and R5 and R1 are optionally bonded to each other to form a heterocycle and R6 and R3 are optionally bonded to each other to form a heterocycle)).

2. The blocked isocyanate according to claim 1, wherein the dissociation temperature of the second blocking agent is 130° C. or less.

3. The blocked isocyanate according to claim 1, wherein the first latent isocyanate group and the second latent isocyanate group are both present in one molecule.

4. The blocked isocyanate according to claim 1, wherein the second blocking agent is at least one selected from the group consisting of an amine compound, a pyrazole compound and an imidazole compound.

5. The blocked isocyanate according to claim 1, wherein the blocked isocyanate is modified with a hydrophilic compound containing an active hydrogen group.

6. The blocked isocyanate according to claim 5,
wherein the blocked isocyanate is a reaction product of
a hydrophilic group-containing polyisocyanate in which a portion of the isocyanate group is allowed to react with the active hydrogen group of the hydrophilic compound, and also the remaining portion of the isocyanate group is in free-state, and
the first blocking agent and the second blocking agent; and
the hydrophilic compound is a polyoxyethylene compound having at least three continuous ethylene oxide groups; and
7 mass % or more and 30 mass % or less of the ethylene oxide groups is contained in the hydrophilic group-containing polyisocyanate.

7. A coating composition comprising a blocked isocyanate,
wherein the blocked isocyanate is a blocked isocyanate containing a latent isocyanate group, which is an isocyanate group blocked with a blocking agent,
the blocked isocyanate comprises a first latent isocyanate group that is an isocyanate group blocked with a first blocking agent and a second latent isocyanate group that is an isocyanate group blocked with a second blocking agent,
the first latent isocyanate group and the second latent isocyanate group are both present in one molecule, or are present separately in different molecules in which only the first latent isocyanate group is present in one molecule and only the second latent isocyanate group is present in another molecule,
the first blocking agent is represented by general formula (1) below,
a dissociation temperature at which the first blocking agent and the second blocking agent in the blocked isocyanate comprising the first latent isocyanate group and the second latent isocyanate group are dissociated is lower than a dissociation temperature at which the second blocking agent in a blocked isocyanate comprising only the second latent isocyanate group and not comprising the first latent isocyanate group is dissociated, and 1 mol % or more and 30 mol % or less of the first latent isocyanate group is contained relative to a total mol of the first latent isocyanate group and the second latent isocyanate group:

[Chem. 2]

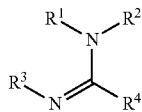

(1)

(where R1 to R3 represent a hydrocarbon group having 1 to 12 carbon atoms or a hydrogen atom, and at least one of R1 to R3 represents a hydrogen atom, and R1 and R3 are optionally bonded to each other to form a heterocycle; R4 represents an atomic group represented by —NR$^5$R$^6$ (R5 and R6 represent a hydrocarbon group having 1 to 12 carbon atoms, and R5 and R1 are optionally bonded to each other to form a heterocycle and R6 and R3 are optionally bonded to each other to form a heterocycle)).

8. An adhesive composition comprising a blocked isocyanate,
    wherein the blocked isocyanate is a blocked isocyanate containing a latent isocyanate group, which is an isocyanate group blocked with a blocking agent,
    the blocked isocyanate comprises a first latent isocyanate group that is an isocyanate group blocked with a first blocking agent and a second latent isocyanate group that is an isocyanate group blocked with a second blocking agent,
    the first latent isocyanate group and the second latent isocyanate group are both present in one molecule, or are present separately in different molecules in which only the first latent isocyanate group is present in one molecule and only the second latent isocyanate group is present in another molecule,
    the first blocking agent is represented by general formula (1) below,
    a dissociation temperature at which the first blocking agent and the second blocking agent in the blocked isocyanate comprising the first latent isocyanate group and the second latent isocyanate group are dissociated is lower than a dissociation temperature at which the second blocking agent in a blocked isocyanate comprising only the second latent isocyanate group and not comprising the first latent isocyanate group is dissociated, and
    1 mol % or more and 30 mol % or less of the first latent isocyanate group is contained relative to a total mol of the first latent isocyanate group and the second latent isocyanate group:

[Chem. 3]

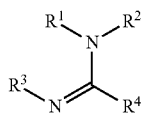

(1)

(where R1 to R3 represent a hydrocarbon group having 1 to 12 carbon atoms or a hydrogen atom, and at least one of R1 to R3 represents a hydrogen atom, and R1 and R3 are optionally bonded to each other to form a heterocycle; R4 represents an atomic group represented by —NR$^5$R$^6$ (R5 and R6 represent a hydrocarbon group having 1 to 12 carbon atoms, and R5 and R1 are optionally bonded to each other to form a heterocycle and R6 and R3 are optionally bonded to each other to form a heterocycle)).

9. An article coated with a coating composition,
    wherein the coating composition comprises a blocked isocyanate,
    the blocked isocyanate is a blocked isocyanate containing a latent isocyanate group, which is an isocyanate group blocked with a blocking agent,
    the blocked isocyanate comprises a first latent isocyanate group that is an isocyanate group blocked with a first blocking agent and a second latent isocyanate group that is an isocyanate group blocked with a second blocking agent,
    the first latent isocyanate group and the second latent isocyanate group are both present in one molecule, or are present separately in different molecules in which only the first latent isocyanate group is present in one molecule and only the second latent isocyanate group is present in another molecule,
    the first blocking agent is represented by general formula (1) below,
    a dissociation temperature at which the first blocking agent and the second blocking agent in the blocked isocyanate comprising the first latent isocyanate group and the second latent isocyanate group are dissociated is lower than a dissociation temperature at which the second blocking agent in a blocked isocyanate comprising only the second latent isocyanate group and not comprising the first latent isocyanate group is dissociated, and
    1 mol % or more and 30 mol % or less of the first latent isocyanate group is contained relative to a total mol of the first latent isocyanate group and the second latent isocyanate group:

[Chem. 4]

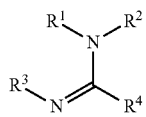

(1)

(where R1 to R3 represent a hydrocarbon group having 1 to 12 carbon atoms or a hydrogen atom, and at least one of R1 to R3 represents a hydrogen atom, and R1 and R3 are optionally bonded to each other to form a heterocycle; R4 represents an atomic group represented by —NR$^5$R$^6$ (R5 and R6 represent a hydrocarbon group having 1 to 12 carbon atoms, and R5 and R1 are optionally bonded to each other to form a heterocycle and R6 and R3 are optionally bonded to each other to form a heterocycle)).

10. An article adhered using an adhesive composition,
    wherein the adhesive composition comprises a blocked isocyanate,
    the blocked isocyanate is a blocked isocyanate containing a latent isocyanate group, which is an isocyanate group blocked with a blocking agent, the blocked isocyanate comprises a first latent isocyanate group that is an isocyanate group blocked with a first blocking agent and a second latent isocyanate group that is an isocyanate group blocked with a second blocking agent, the first latent isocyanate group and the second latent isocyanate group are both present in one molecule, or are present separately in different molecules in which only the first latent isocyanate group is present in one molecule and only the second latent isocyanate group is present in another molecule, the first blocking agent is represented by general formula (1) below, a dissociation temperature at which the first blocking agent and the second blocking agent in the blocked isocyanate comprising the first latent isocyanate group and the second latent isocyanate group are dissociated is lower than a dissociation temperature at which the second blocking agent in a blocked isocyanate comprising only the second latent isocyanate group and not comprising the first latent isocyanate group is dissociated, and 1 mol % or more and 30 mol % or less of the first latent isocyanate group is contained relative to a total mol of the first latent isocyanate group and the second latent isocyanate group:

[Chem. 5]

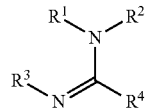

(1)

(where R1 to R3 represent a hydrocarbon group having 1 to 12 carbon atoms or a hydrogen atom, and at least one of R1 to R3 represents a hydrogen atom, and R1 and R3 are optionally bonded to each other to form a heterocycle; R4 represents an atomic group represented by —NR$^5$R$^6$ (R5 and R6 represent a hydrocarbon group having 1 to 12 carbon atoms, and R5 and R1 are optionally bonded to each other to form a heterocycle and R6 and R3 are optionally bonded to each other to form a heterocycle)).

* * * * *